(12) United States Patent
Mellado et al.

(10) Patent No.: US 11,650,126 B2
(45) Date of Patent: May 16, 2023

(54) SYSTEMS AND METHODS FOR AUTOMATIC VISUAL INSPECTION OF DEFECTS IN OPHTHALMIC LENSES

(71) Applicant: Indizen Optical Technologies S.L., Madrid (ES)

(72) Inventors: Juan Antonio Quiroga Mellado, Madrid (ES); José Alonso Fernández, Madrid (ES); Eduardo Pascual, Madrid (ES); Sergio Sampedro, Madrid (ES); Daniel Crespo Vázquez, Torrance, CA (US)

(73) Assignee: Indizen Optical Technologies S.L., Madrid (ES)

( * ) Notice: Subject to any disclaimer, the term of this patent is extended or adjusted under 35 U.S.C. 154(b) by 479 days.

(21) Appl. No.: 17/028,429

(22) Filed: Sep. 22, 2020

(65) Prior Publication Data
US 2022/0090983 A1    Mar. 24, 2022

(51) Int. Cl.
*G01M 11/02*    (2006.01)
*G01N 21/958*    (2006.01)

(52) U.S. Cl.
CPC ....... *G01M 11/0278* (2013.01); *G01N 21/958* (2013.01); *G01N 2021/9583* (2013.01)

(58) Field of Classification Search
CPC ............. G01M 11/0278; G01N 21/958; G01N 2021/9583
See application file for complete search history.

(56) References Cited

U.S. PATENT DOCUMENTS

| 7,256,881 B2 | 8/2007 | Leppard et al. |
| 8,295,581 B2 | 10/2012 | Dubois et al. |
| 10,267,750 B2 | 4/2019 | Vild et al. |

(Continued)

FOREIGN PATENT DOCUMENTS

| WO | 2008125660 A1 | 10/2008 |
| WO | 2011117539 A1 | 9/2011 |

OTHER PUBLICATIONS

World Intellectual Property Organization, International Search Report and Written Opinion for International Application No. PCT/2021/050325, dated Dec. 21, 2021, total of 27 pages.

(Continued)

*Primary Examiner* — Dominic J Bologna
*Assistant Examiner* — Amanda Merlino
(74) *Attorney, Agent, or Firm* — SoCal IP Law Group LLP; Angelo Gaz; Mark A. Goldstein

(57) ABSTRACT

Automatic visual inspection (AVI) systems and methods are disclosed for inspecting transmissive lenses using a plurality of camera poses to provide deflectometric measurements using fringe patterns from at least two points of view. Phase and/or modulation visibility values of the deflectometric measurements are measured for two sensitivities of the patterns taken through an inspection area of the lens from the points of view. Defects are detected based on the phase and/or modulation visibility values at a defect location as compared to at the local area. A defect type is classified to be prismatic, transmissive, lenslet or cosmetic based on the phase and/or modulation visibility values. The defect is localized on the front or back surface of the lens based on the phase and modulation visibility values, and a geometry of the lens orientation. The lens can be invalidated based on defect types, numbers, relative positions and locations.

23 Claims, 20 Drawing Sheets

System 100

(56) References Cited

U.S. PATENT DOCUMENTS

2002/0131052 A1    9/2002  Emery
2004/0004693 A1    1/2004  Chrusch, Jr. et al.

OTHER PUBLICATIONS

F. Etzold, D. Kiefhaber, A. F. Warken, P. Würtz, J. Hon, and J.-M. Asfour, "A novel approach towards standardizing surface quality inspection," in Third European Seminar on Precision Optics Manufacturing, 2016, doi: 10.1117/12.2235743.
D. M. Aikens, "Objective measurement of scratch and dig," in Optics InfoBase Conference Papers, 2012, doi: 10.1364/oft.2012.otu2d.5.
H.-D. Lin, W.-T. Lin, and H.-H. Tsai, "Automated Industrial Inspection of Optical Lenses Using Computer Vision," 2012.
J. H. Massig, "Deformation measurement on specular surfaces by simple means," Opt. Eng., vol. 40, No. 10, pp. 2315-2318, 2001, doi: 10.1117/1.1403453.
D. Beghuin, X. Dubois, and L. Joannes, "Phase object power mapping and cosmetic defects enhancement by Fourier-based deflectometry," in Optical Measurement Systems for Industrial Inspection VI, 2009, doi: 10.1117/12.827670.
M. Servin, J. A. Quiroga, and M. Padilla, Fringe Pattern Analysis for Optical Metrology: Theory, Algorithms, and Applications. Wiley vch, 2014.
C. M. Cilip, D. S. Pratt, and M. B. Bauza, "Visual Inspection of Cosmetic and Functional Defects in a Manufacturing Environment." 2013.
J. H. Massig, "Measurement of Phase Objects by Simple Means," Appl. Opt., vol. 38, No. 19, p. 4103, Jul. 1999, doi: 10.1364/AO.38.004103.

System 150

System 100

Setup 200

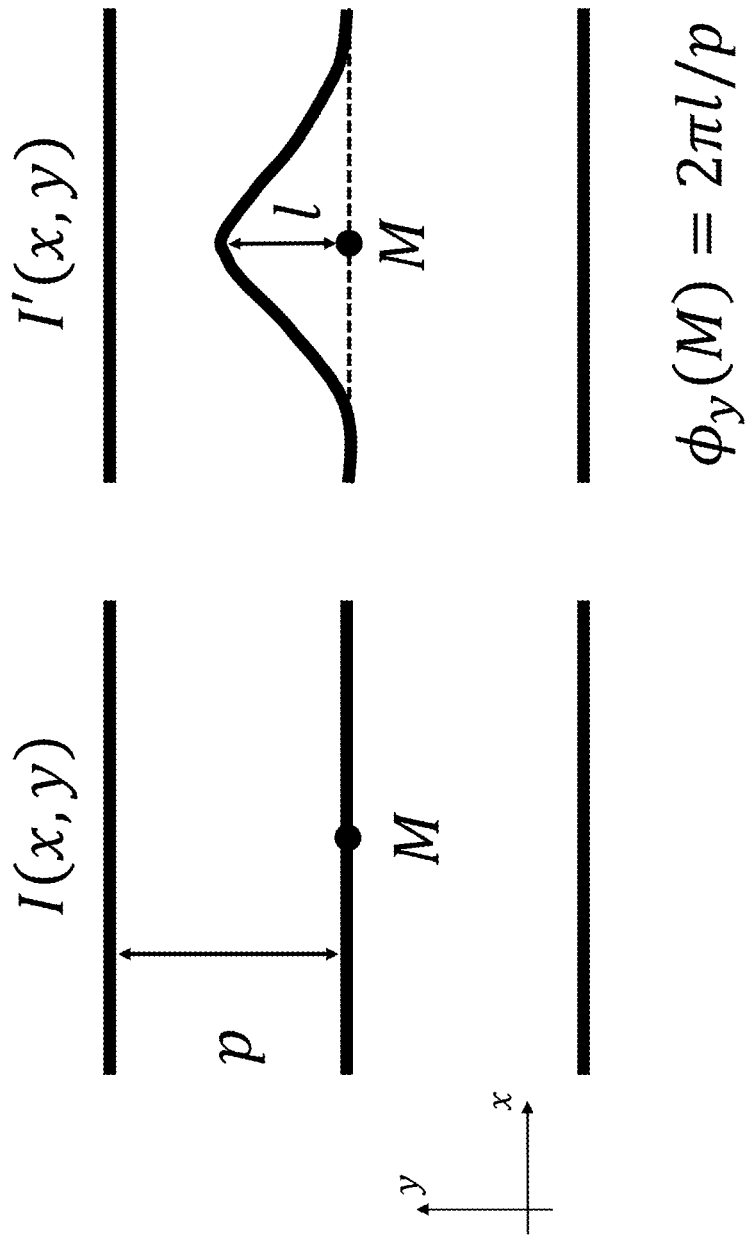

Prismatic Defect Schematic 400

Lenslet Defect Schematic 600

Maps 700

Maps 750

Transmissive Defect Schematic 800

Setup 1300

Setup 1600

SYSTEMS AND METHODS FOR AUTOMATIC VISUAL INSPECTION OF DEFECTS IN OPHTHALMIC LENSES

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure pertains to the field of optics. In particular, it relates to systems and methods for automatic visual inspection of defects in ophthalmic lenses using phase visibility values and/or modulation visibility values of deflectometric measurements.

Description of the Related Art

Ophthalmic lenses (optical elements) are designed to provide corrective optical power to improve visual acuity, correct for aberrations or optical defects in the eye and enhance quality of life and visual performance.

Modern ophthalmic lens manufacturing is a complex process that involves many additional steps to the lens surfacing. The lenses may have films, coatings, discrete layers, and discrete solid structures with optical, chemical and/or physical properties desirable for the lens. A lens may have features incorporated on, in or with it or any of its surfaces, such as films, layers, inserts, coatings, passive dyes, photochromic dyes, tints, pigments, polarizers, displays, electronics, sensors, jewelry, inlays, light filters, ultraviolet filters or absorbers, infrared filters, alignment mechanisms and other discrete or continuous features. The optical material of a lens may have additives such as ultraviolet absorbers, thermal or light stabilizers, light reflectors or blockers, antioxidants, surface energy modifiers and other additives or agents. In one example, a lens may have a scratch-resistant hard coating, an anti-reflective coating, and a solid transparent, optical material with a refractive index or ophthalmic property.

Some optical lenses provide relief from or reduction of brightness, such as that of direct sunlight. For example, photochromic lenses, sometimes referred to as transition lenses, are eyeglass lenses that will turn dark (resembling sunglasses) in sunlight and become clear again when indoors. This is the result of chemical responses to the presence (and absence) of ultraviolet light. Photochromic lenses are very useful for driving, sports, and outdoor activities. They can even cut down on the harmful glare of electronic devices.

Ophthalmic lenses are produced with many of these features and materials, such as ophthalmic lenses with photochromic properties and optionally with a lens coating. A photochromic semifinished lens (e.g., a blank, photochromic semifinished lens) is a lens with photochromic properties and with only one side having the desired curvature for providing ophthalmic properties. The second side must yet be surfaced in order to bring the lens to its desired ophthalmic power and thickness. In some cases, the front side has the curvature and the back side is yet to be surfaced. On the other hand, a finished lens (e.g., a blank, finished lens) is a lens having both front and back surfaces ground to the desired powers, but not yet edged to the shape of the frame of the glasses it will be put into.

In some cases, starting with standard semifinished lenses (e.g., a blank, semifinished lens), photochromic semifinished lenses are manufactured by applying a photochromic coating at the frontal surface of the standard semifinished lenses. The process is very prone to the apparition of defects in the photochromic coating in the form of small dents, cracks, scratches, holes, pits, bumps, adsorbed particles, deposits or embedded particles, for example. In other case the semifinished lenses must be tested for scratches and digs on the surface that may hinder the further surface coating. In a final example finished lenses with an anti-reflection coating must be inspected for adsorbed particles, deposits or embedded particles generated during the coating and further manipulation process.

During production or as a product, the lens surface must have optical quality and be defect free. Thus, the lenses should be tested for lens defects in order to guarantee the quality of the final product. The testing may be done according to a visual inspection standard that uses figures of merit for the surface quality of an optical element or component, such as a lens or prism. The processes by which lenses are made inevitably leave imperfections on surfaces or within the lens. Surface "Digs" are pits. A scratch-and-dig evaluation of an optical part addresses two concerns. One is cosmetic. A manufacturer would find it hard to sell a lens with a visible scratch on the front surface, even though the scratch had no noticeable effect on visibility. The second is functional. By scattering light these imperfections can, for example, lower contrast or create inconsistent visibility.

Consequently, lens defects can generally be classified as cosmetic or functional. Cosmetic defects are defects that do not interfere with the function of the optical element but can produce rejection from the final customer, for example, a small surface scratch on the frontal side of an ophthalmic lens. On the other hand, a functional defect can invalidate the use of the optical element, for example, in high power optics, a small functional defect can produce undesired scattering and energy absorption that can destroy the lens. Another example are imaging instruments like a telescope, a binocular, or an eyepiece, for which a defect can produce undesired diffraction patterns. For cosmetic defects, the perceived reflected luminous intensity is more important than its physical size. Luminous intensity is the photometric quantity related with the perceived "brightness" of a small, point-like, source.

In some current lens production lines, the inspections are operated by human inspectors that follow visual inspection standards. Some possibilities for surface defect grading include the MIL-PRF-13830B, ANSI OP1.002, and ISO 10110-7 standards. Experience indicates that human inspection of small-size defects is prone to false positives and false negatives. Human inspection has small repeatability between classifications by the same inspector and a small correlation between different human inspectors. Also, a human visual inspection can barely determine the size of small defects (characteristic length of 0.1-0.2 mm or less located in a 60-70 mm field). Another important aspect is the relative defect brightness. For a human inspector, the brightness comparison between samples and also between a sample and the standard is a challenging task. Therefore, the implementation of visual inspection standards relies on highly skilled inspectors that are hard to train and substitute.

Finally, implementation of the same visual inspection standards across different geographical locations is almost impossible.

Consequently, there is a need for an automatic visual inspection (AVI) system that can meet the testing requirements of a production line or product of optical elements, such as photochromic semifinished lenses. The AVI system may meet the requirements by testing by testing at various test inspection stages according to one or more visual inspection standards.

SUMMARY

Embodiments of an AVI system (i.e., system, device, kit, configuration and/or method) are described that provide automatic visual inspection (AVI) of defects in ophthalmic and other lenses using phase visibility values and/or modulation visibility values of deflectometric measurements. For example, embodiments of an AVI system and/or method for inspecting cosmetic defects in a transmissive lens include using a plurality of camera poses or orienting the lens to provide deflectometric measurements from at least two points of view of the lens for at least one oriented fringe pattern of dark and bright bars, then measuring phase visibility values and/or modulation visibility values of the deflectometric measurements for at least two different sensitivities of a deflectometric setup using the at least one fringe pattern taken through an inspection area of the lens from the at least two points of view. In some cases, the phase visibility values and/or modulation visibility values of the deflectometric measurements of the at least one fringe pattern taken through an inspection area of the lens are measured from the at least two points of view for at least two different sensitivities.

Defects are then detected on the front surface or the back surface of the lens at a defect location in the inspection area based on the phase visibility values and/or modulation visibility values at the defect location as compared to the values of a local neighborhood area immediately adjacent to and surrounding the defect location. The defect type of the defect is then classified to be a prismatic defect type, a transmissive defect type, a lenslet defect type or a cosmetic defect type based on the phase visibility values and/or modulation visibility values at the defect location as compared to the values of a local neighborhood area. The defect is also localized as being located on the front surface or on the back surface of the lens based on the phase visibility values and/or modulation visibility values from the at least two points of view and a geometry of the lens orientation to the two points of view. The lens is invalidated depending on the visual inspection standard or surface defect grading standard used. These standards are based on the defect type, the defects number and relative position (clusters), its location in the inspection area, its size, its brightness and its location on the front or the back surface. For example, for a photochromic semifinished lens all defects of any defect type on the back surface are irrelevant, because the final photochromic lens will be manufactured by surfacing the back surface of the semifinished lens. In other example, for a finished lens of any type, a cosmetic defect located on the front or the back surface is equally important.

Advantageously, the deflectometric AVI measurement systems provide better inspection than prior uses of direct imaging. In addition to defect detection, they are able to estimate the defect luminous intensity, length and area; make the distinction between dust and cosmetic defects; and localize the defect in the back or front surface of the lens. They are also able to assist or replace the human visual inspection of defects in ophthalmic lenses, which is prone to errors and inconsistency.

These and other features and advantages should become more readily apparent from the detailed description set forth below taken in conjunction with the accompanying drawings.

DRAWINGS

The following disclosure is described, by way of example only, with reference to the following drawings.

FIG. 2B illustrates a typical example of a fringe pattern observed without a lens placed in the AVI system.

FIG. 2C illustrates a typical example of a fringe pattern observed with a lens placed in the AVI system and shows graphically the concept of the measured phase.

Figure 1B:
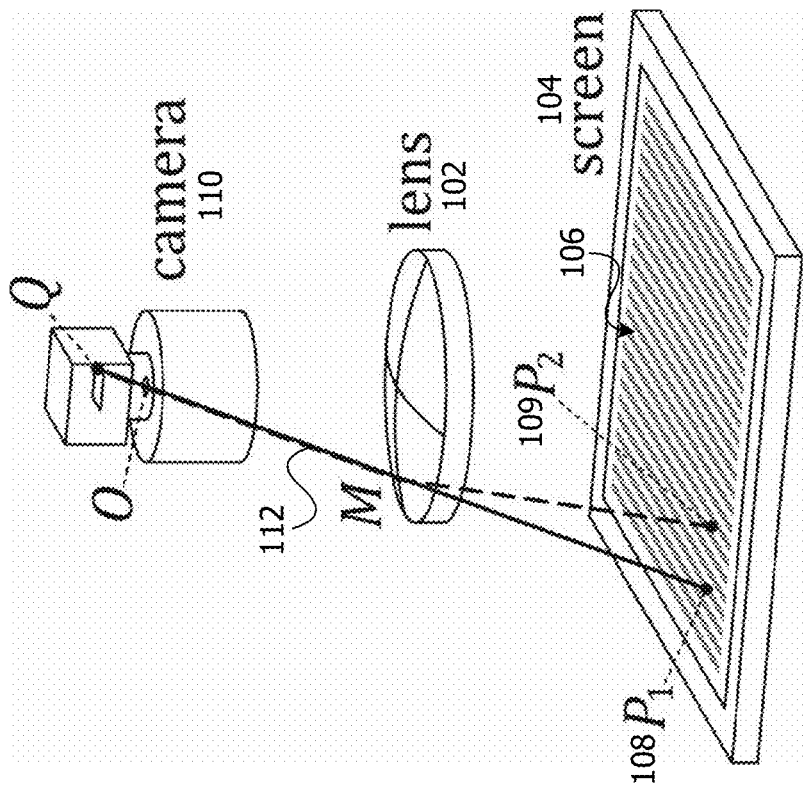
FIG. 1B illustrates an isometric perspective view of a first embodiment of a basic configuration for the AVI system.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

This disclosure is directed to the automatic visual inspection (AVI) of defects in ophthalmic lenses using phase visibility values and/or modulation visibility values of deflectometric measurements. For example, the inspection can use only phase visibility values; only modulation visibility values; or phase and modulation visibility values, depending on the particular case. The optical methods, systems and machines for this AVI inspect ophthalmic lenses to detect defects and to classify the ophthalmic lenses as good or bad. The AVI systems (i.e., device, kit, configuration or method) distinguish between dust and cosmetic defects; identify whether the defect is on the back or front surface of the lens; and estimate the defect luminous intensity and area.

For example, embodiments of an AVI system and/or method for inspecting cosmetic defects in a transmissive lens include using a plurality of camera poses or orienting the lens to provide deflectometric measurements from at least two points of view of the lens for at least one oriented fringe pattern of dark and bright bars, then measuring phase visibility values and/or modulation visibility values of the deflectometric measurements for at least two different sensitivities of a deflectometric setup using at least one fringe pattern taken through an inspection area of the lens from the at least two points of view. Defects are then detected on the front surface or the back surface of the lens at a defect location in the inspection area based on the phase visibility values and/or modulation visibility values at the defect location as compared to the values of a local neighborhood area immediately adjacent to and surrounding the defect location. A determination of a defect type then made based on the phase visibility values and/or modulation visibility values at the defect location as compared to the values of a local neighborhood area. The defect type is classified to be one of a prismatic defect type, a transmissive defect type, a lenslet defect type or a cosmetic defect type. The defect is also localized as being located on the front surface or on the back surface of the lens based on the phase visibility values and/or modulation visibility values from the at least two points of view and a geometry of the lens orientation to the two points of view. The lens is invalidated depending on the visual inspection standard or surface defect grading standard used.

It is noted that there can be two "orientations" described for the AVI system. One "orientation" can be the relative orientation between the lens, the camera and the screen to offer different points of view of the lens under inspection. The AVI can observe the lens with at least two points of view. This can be achieved by orientating and/or moving the lens while the camera is fixed; or by fixing the lens under inspection and orientating and/or moving the camera. In either case the point of view of the lens observed from the camera is changed. Another "orientation" can be the orientations of multiple fringe patterns relative to each other on the screen, such as by orienting two fringe patterns vertically and horizontally on the screen. The two oriented patterns can be displayed separately, one after the other as two fringe pattern screens; or displayed together on a single screen.

The AVI systems may also meet the requirements of a lens production line by testing (for example, visually inspecting) lenses at various test inspection stages of the production line, according to one or more visual inspection standards. Advantageously, the AVI deflectometric measurements provide better inspection than prior uses of direct imaging. In addition, the AVI system can assist or replace the human visual inspection of defects in ophthalmic lenses, which is prone to errors and inconsistency. The devices, principles and methods described herein are also applicable for the automatic inspection of defects of any transparent or specular product, such as lenses (whether ophthalmic or not), contact lenses, intraocular lenses, prisms, windows, plates, windscreen, mirrors, face shields and other transparent material.

In contrast to previous systems, the embodiments described herein:
- Automatically detect and classify relevant defects of a lens following a visual inspection standard or a defect grading standard like MIL-PRF-13830B, ANSI OP1.002 and ISO 10110-7;
- Automatically locate the defects and identify the front or back surface on which they sit;
- Automatically differentiate between actual defects and dust or dirt particles on the surfaces;
- Automatically classify a lens as good or bad in terms of a visual inspection standard or a defect grading standard;
- Implement and apply any explicit written visual inspection standard for lens classification;
- Implement and apply, as a machine learning process, the unwritten implicit criteria for the assessment of the cosmetic quality of a lens used by a skilled inspector;
- Ensure that the evaluation of a lens surface quality, in terms of visually permissible defects, is consistent throughout the lab network;
- In the case of assisted operation, prevent inspector fatigue; and/or
- Create a model lens production line with statistical or machine learning methods for:
  1. Measuring trends in the cleanliness of the production line;
  2. Measuring trends in the lens quality;
  3. Measuring stability of the production line;
  4. Determination of causes for the defects.

The AVI system may also be used as an improved lens mapper for measuring the inspected lens optical power. The AVI system includes two or more cameras to locate the defects in the front or back surface of the lens. If the AVI system is used as a mapper, the existence of two or more cameras has a significant advantage in terms of the measurable field, especially for semifinished lenses, which usually have a large thickness. For finished lenses, the use of two or more cameras has the advantage of making redundant measurements that make the AVI process more precise.

In addition, it is possible to create a model lens production line with statistical or machine learning methods. The AVI system can aggregate lens power measurements obtained during the AVI process to model production line characteristics.

Optical Principles: Phase Measuring Deflectometry

Figure 1A:
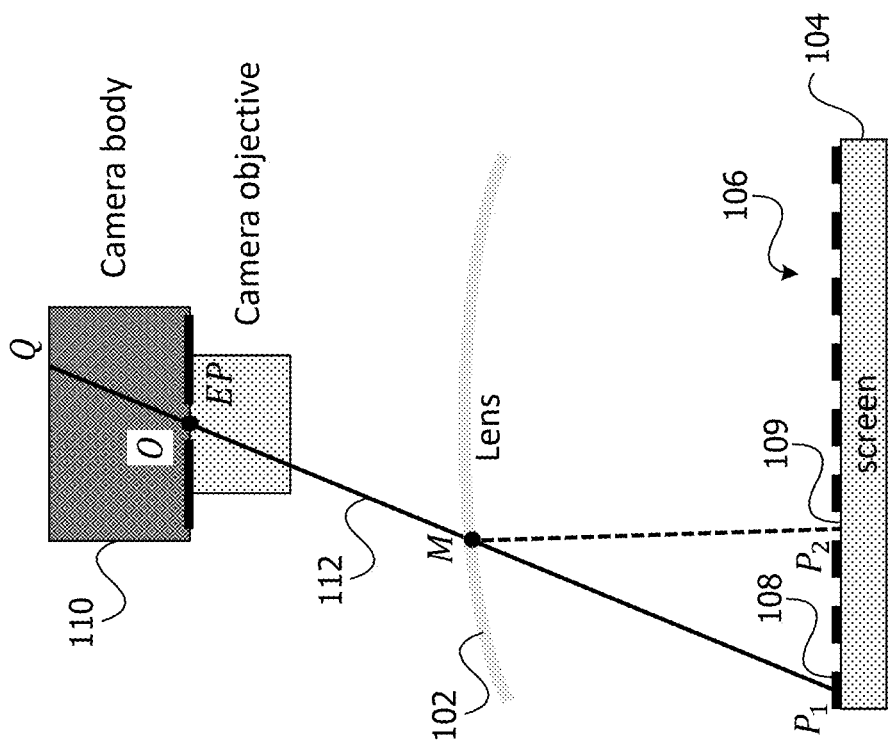
FIG. 1A illustrates a cross-section side view of a first embodiment of a basic configuration for the AVI system.

FIG. 1A illustrates a cross-section side view 100 of a first embodiment of a basic configuration for the AVI system. FIG. 1B illustrates an isometric perspective view 150 of a first embodiment of a basic configuration for the AVI system. The lens 102 under inspection is placed between a screen 104 and a camera 110. In one embodiment, the AVI system detects lens defects with 0.05 mm size or above with an inspection area of 75 mm located at 140 mm from the camera. Other defect sizes and inspection areas may be used. The camera used may be a USB 3.0 camera having a 1" sensor with resolution 5,472×3,648 pixels (20 MP), with pixel size 2.4×2.4 µm, and frame rate 18 fps. Larger sensors, higher resolutions and greater frame rates may be used. The camera may be equipped with a 25 mm objective working with an aperture of f/8. The camera may have a 25 mm objective lens with a sensor/camera aperture of f/8. This small aperture makes the pinhole imaging model with optical center O a good approximation. In this configuration, the camera captures test images 106 shown on the screen 104, as seen through lens 102. The most typical test images are sets of fringe patterns (dark and bright bars) represented by the black dash lines 108 on the screen 104 in FIGS. 1A-B. The screen may be an LCD monitor located at 300 mm from the camera, with size 337.9×270.3 mm, having an SXGA resolution of 1280×1024 pixels and a luminance of 1500 cd/m$^2$. Other distances, screen size, screen resolution and screen brightness may be used depending on the implementation. The dark bars may be bars of black or no color displayed on the screen. The bright bars may be bars of white or all colors displayed on the screen. Without a lens 102 under testing, the camera images point $P_1$ on point Q. This imaging process is represented by the intersection of the principal ray 112 with the image plane (represented by the plane where point Q is placed) after passing through the entrance pupil (EP) center (marked by optical center O). The principal ray is the ray from object to image points passing through the optical center. In this example, without a testing lens 102, image point Q will be black because point $P_1$ on the screen is on a black stripe 108.

When the testing lens 102 is inserted between the camera 110 and the screen 104, the lens 102 deflects the rays, and the image changes. With the lens 102 in place, the principal ray 112 joining the optical center O, and the image point Q intersects the lens at point M. The lens deflects the principal ray QOM toward point $P_2$ on the screen 104. This imaging process is represented by the dashed principal ray in FIG. 1. That is, with a lens 102, point Q appears bright because the lens deflects the ray QOM toward object point $P_2$ located on a bright stripe 109. This change in brightness between the two cases, with and without the lens, is the basis for the lens defect automatic visual inspection system. This technique is called transmission deflectometry.

The same measuring principle can be implemented using the reflection on the front surface of the lens 102 instead of transmission through the lens. In this case, the technique is called reflection deflectometry.

Views 100 and 150 may represent an AVI system or be part of an AVI system or method for detecting lens defects of semifinished or finished lenses using at least one visual inspection standard, such as those noted herein. In some cases, the lens 102 is held by a lens holder (not shown), to position the lens in a proper orientation to provide deflectometric measurements as discussed herein.

Figure 2A:
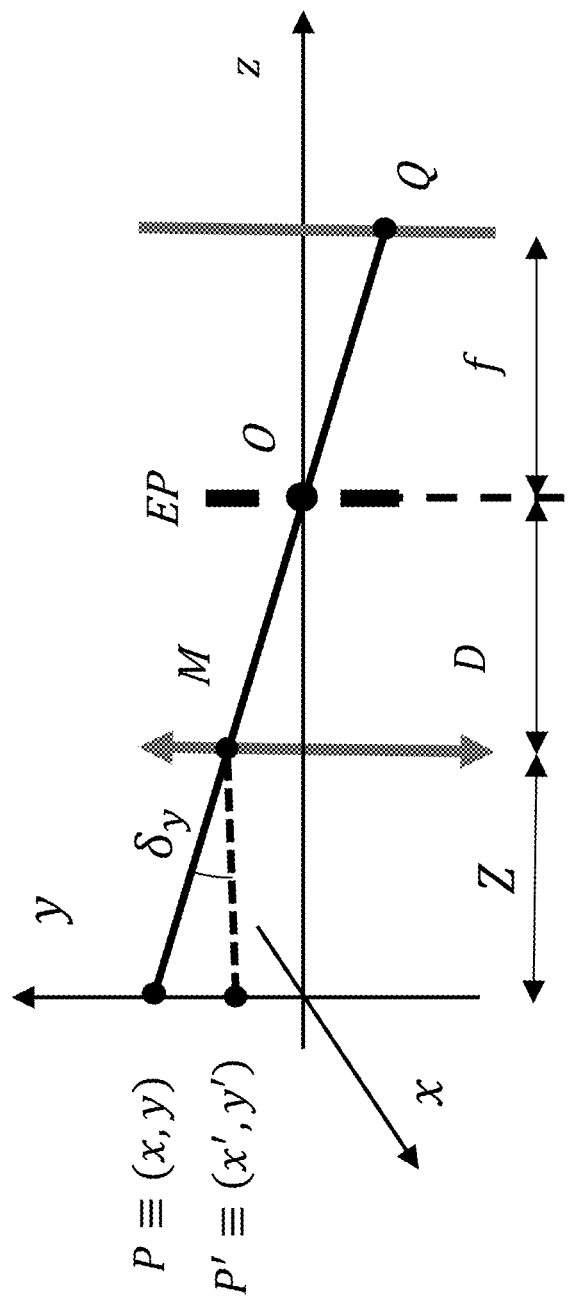
FIG. 2A illustrates a schematic of a phase measuring deflectometry configuration.

FIG. 2A illustrates a schematic 200 of a phase measuring deflectometry configuration. Schematic 200 may be part of an AVI system that includes AVI devices, systems, configurations and methods described herein. Referring now to FIGS. 1A, 1B and 2, it is common practice to model the camera 110 of FIGS. 1A and 1B as a pinhole system, defined by a optical center O with the image plane located at the focal distance f from O as shown in FIG. 2. At the image plane there is a 2D imaging sensor that captures a 2D image (in the xy plane) of the inspection area that can include the entire lens, depending on the field of view. Without a lens 102, point P≡(x,y) on the screen plane of screen 104 is imaged on point Q on the camera's image plane. When we place a lens 102 (represented by the two-headed arrow) at a distance Z from the screen, the ray landing on Q comes from a different screen point P'=(x', y'), due to the deflection produced by the lens at M. By measuring the spatial locations of P and P', for example by imaging a structured pattern on the screen, we can obtain the deflection angle $\delta_y$ at point M=(ξ,η) on the lens as a map $\delta_y(\xi,\eta)$ where (ξ,η) are the lateral coordinates at the lens plane $$\tan\delta_y(\xi, \eta) = \frac{y' - y}{Z} \quad (1)$$

In FIG. 2A we have only depicted the vertical deflection $\delta_y(\xi,\eta)$, but in general the deflection will have also a horizontal deflection given by $$\tan\delta_x(\xi, \eta) = \frac{x' - x}{Z}$$

For measuring the deflection, a sinusoidal fringe pattern may be used. As noted, various shaped of patterns of dark and bright bars can be used. Here a sinusoidal fringe pattern is used for the calculations. In this case, the system images a sinusoidal fringe pattern 106 displayed on the screen plane and measure the changes in image brightness at point Q of the image plane with and without the lens 102.

When a horizontal sinusoidal pattern with the bars oriented along the x axis is placed on the screen 104, the irradiance at the point Q of the image plane is given by $$I(Q) = b + m\cos\left(\frac{2\pi}{p}y\right)$$

where b and m are the image background and modulation, respectively, y is the horizontal coordinate at the screen plane and p the fringe period.

When a lens is placed between the camera and the screen, the irradiance changes to $$I'(Q) = b + mT(M)\cos\left[\frac{2\pi}{p}(y + Z\delta_y)\right]$$

where Z is the lens-screen distance, $\delta_y$ is the vertical deflection angle at point M=(ξ,η) and T(M) the transmittance of the lens at point M. Using demodulation techniques, from the 2-dimensional irradiance maps I(Q) and I'(Q) we can obtain a complex 2-dimensional x,y map defined on the image plane given by $$A(Q) = \frac{1}{2}m_\phi T(M)\exp[iS\delta_y] \quad (2)$$

where $$S = Z\frac{2\pi}{p} \quad (3)$$

is the sensitivity of the deflectometric setup, and $m_\phi$ represents the change in modulation due to the demodulation algorithm and the spatial sampling on the image plane.

Sensitivity (e.g., "S") of the deflectometric setup is important. The sensitivity may be a property of the deflectometric setup. It is based on a distance between the screen and the lens, and the period p of the fringe pattern. Different sensitivities are used to distinguish between dust on a lens as compared to actual cosmetic defects of the lens. Sensitivities are used to differentiate between two situations, high (S») and small (S«) sensitivities. In experiments, typical high sensitivities are S=20π and above. On the other hand, low sensitivities correspond to values lower than π. However, there may be other number ranges as noted herein. From eq (3), for a fixed distance between the lens and the screen (Z) the fringe period is inversely proportional to the sensitivity. Thus, a small sensitivity, S«, implies a big fringe period, p». On the other hand, a large sensitivity, S», involves a small fringe period, p«. For example, in a typical configuration with Z=210 mm we have p=4 mm for S» and p=420 mm for S«.

The complex 2-dimensional map A(Q) of equation (2) is composed by a 2-dimensional x,y phase map $$\phi_y = \text{angle}[A(Q)] = S\delta_y \quad (4)$$

and a 2-dimensional x,y modulation map $$m = |A(Q)| = \frac{1}{2}m_\phi T(M) \quad (5)$$

From herein we will denominate "2-dimensional x,y maps" simply as "maps".

In general, the modulation m depends on the camera pixel size, the fringe period p, the type of demodulation method, and the local characteristics of the lens surface around point M. The phase $\phi_y$ is a direct measurement of the lens deflection map $\delta_y$. For this reason, the technique is known as phase measuring deflectometry.

FIG. 2B illustrates a typical example 230 of a fringe pattern observed without a lens placed in the AVI system. FIG. 2C illustrates a typical example 260 of a fringe pattern observed with a lens placed in the AVI system and shows graphically the concept of the measured phase. In terms of the observed fringe patterns, the phase $\phi_y$ is a measure of the vertical fringe deviation that appears when a lens is inspected by the AVI. In FIG. 2B we depict a horizontal fringe pattern without lens denoted by I(x,y). The fringe period of the undistorted fringe pattern is p. When the lens is inspected as shown in FIG. 2C, the fringe pattern is distorted, denoted by I'(x,y). If the vertical deviation of the fringe at point M is l, then the phase at point M is given by $\phi_y(M)=2\pi l/p$ And from FIG. 2A, the deviation l is related with the vertical deflection by $l=Z\delta_y(M)$.

In this example, a horizontal fringe pattern is used to obtain the vertical deflection $\delta_y$. A vertical (orthogonal) fringe pattern may be used to determine the horizontal $\delta_x$ deflection. From the two orthogonal deflections and the modulation change, relevant lens properties like the local deflection (prism maps), local power (power maps), and the presence of cosmetic defects may be determined. The horizontal and vertical patterns can be shown on the screen separately, i.e. first a set of horizontal patterns and then a second set of vertical patterns. As an alternative it is possible to show a single fringe pattern that contain superposed (i.e., superimposed) vertical and horizontal fringes. In general, the modulation and phase maps in the x and y directions can be obtained using at least one fringe pattern.

Defect Effects on the Phase and Modulation Maps

Figure 3:
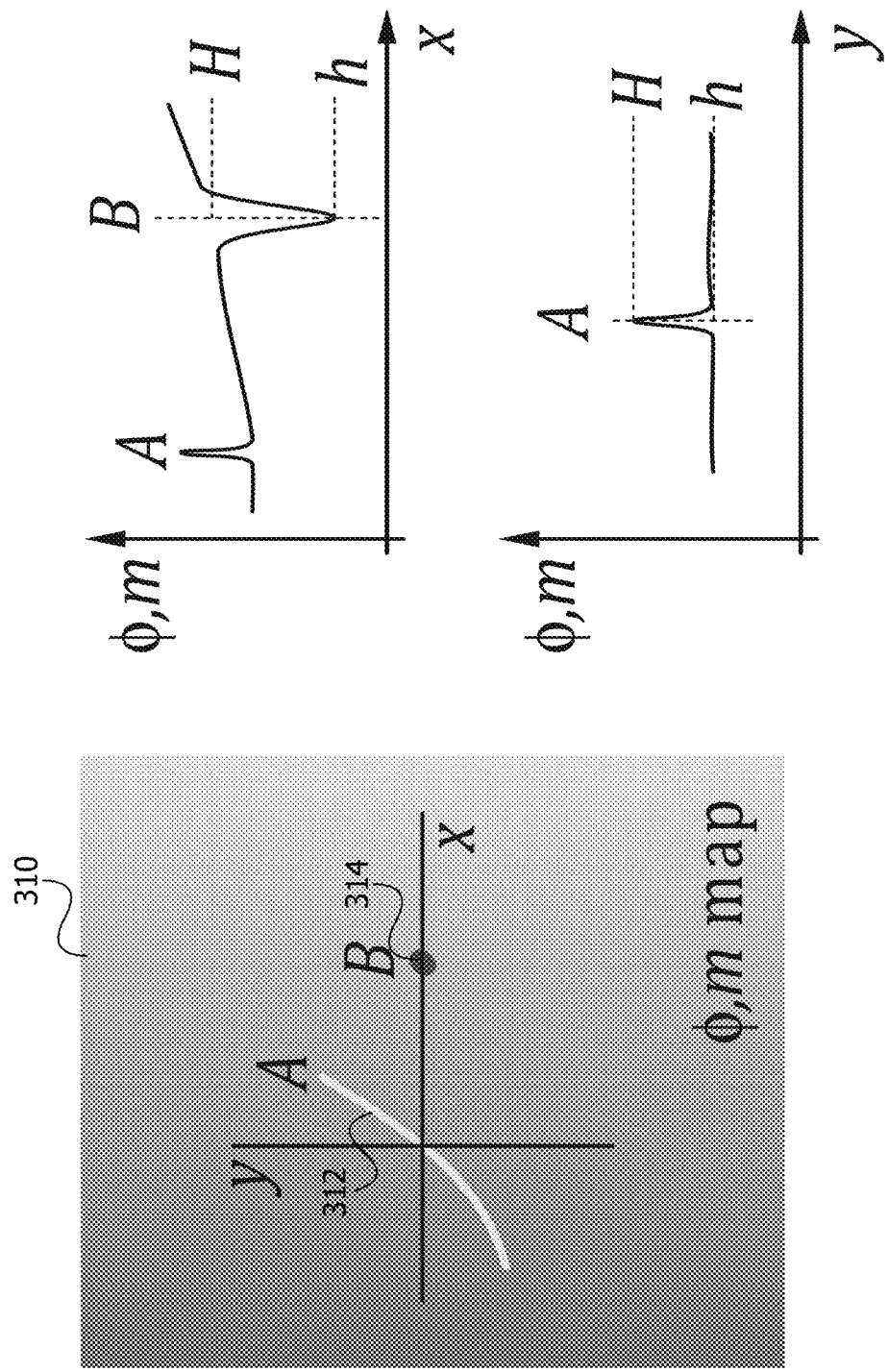
FIG. 3 illustrates a typical example of a modulation or phase map with two defects, a scratch (A) and a pit (B).

FIG. 3 illustrates a typical example of modulation or phase maps 300 with two defects, a scratch (A) and a pit (B). Maps 300 may be part of an AVI system that includes AVI devices, systems, configurations and methods described herein. In the phase and modulation maps obtained from phase measuring deflectometry, a small defect appears as a dent, bump, or a line. The map values in the defect neighborhood 310 are different than the map values at the defect locations 312 of scratch A and 314 of pit B. A visibility V of a defect is defined as $$V = \frac{H - h}{H + h} \quad (6)$$

where H and h are the maximum and the minimum values of the map in the defect's neighborhood (see FIG. 3 right side). Profiles of the map along the x and y directions produce the curves depicted at the right in FIG. 3. The horizontal section crosses through the two defects, and we can see the rapid variation of the phase/modulation maps on the defects. Values H and h are the maximum and minimum values of the observed quantity (either modulation or phase) in the neighborhood of the defect.

A neighborhood or inspection area is an area inspected by an AVI system and/or method over a period of time before the system moves to another area or neighborhood of the lens. In some cases, neighborhood 310 has a lateral extension of between 60 mm and 70 mm. In some cases, it is between 10 mm and 100 mm. It may also be the entire size of the lens. In some cases, defect A or B has a lateral extension 312 or 314 of between 0.001 mm and 0.1 mm. In some cases, the area is 10× that much. It may also be a lateral extension between 0.001 mm and 2 mm. In some cases, the defect length or area is 1/100 the size of the neighborhood. It may also be 1/1,000 the size. It may be 1/10,000 the size.

Visibility is important to defect detections. Visibility is used to quantify a defect's importance.

Two optical principles impact the system. First, use of the sensitivity of a deflectometric setup in phase measuring deflectometry for differentiation between defect types, and second, use of the modulation map visibility as an estimator of the defect brightness and area.

We can classify the defect types in three classes: prismatic, lenslet, and transmissive.

Visibility of a Prismatic Defect in the Phase and Modulation Maps

Figure 4:
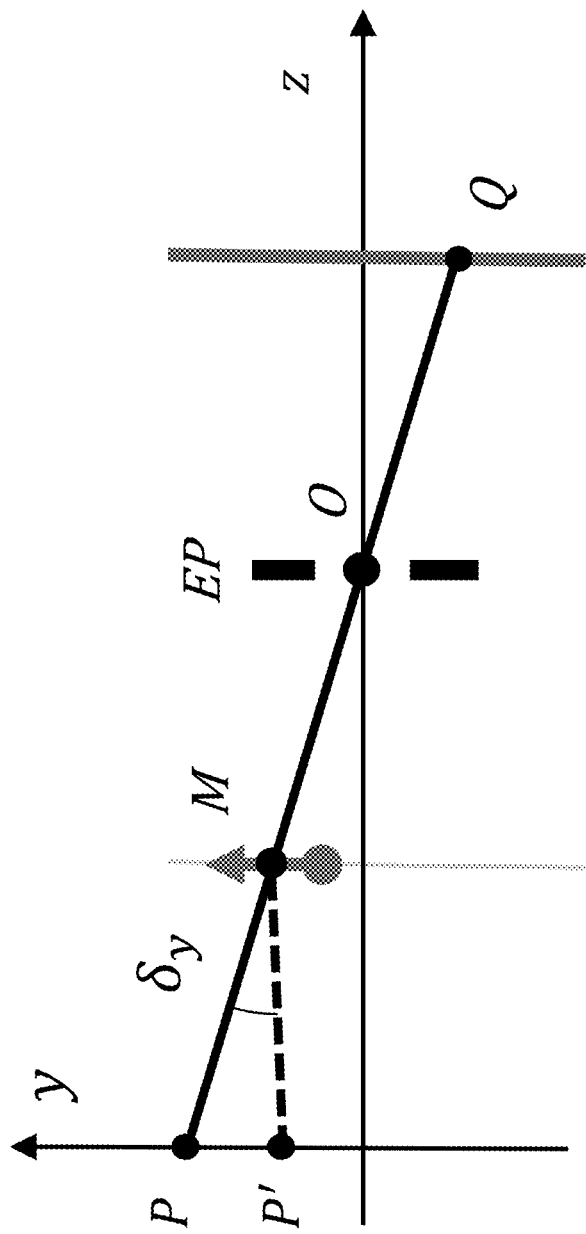
FIG. 4 illustrates a schematic 400 of how a prismatic defect produces an angular deviation of the ray that passes through it in a phase measuring deflectometry configuration.

FIG. 4 illustrates a schematic 400 of how a prismatic defect produces an angular deviation of the ray that passes through it in a phase measuring deflectometry configuration. The schematic 400 may be part of an AVI system that includes AVI devices, systems, configurations and methods described herein. A prismatic defect generates deflection and has a transmittance close to 1, T(M)≈1 in equation (2). In FIG. 4, a prismatic defect, represented by the vertical arrow with a circle end, located at point M of the surface under inspection. For a defect-free surface, point P on the screen will image at point Q of the camera plane though the principal ray $\overline{PMOQ}$ that intersects the surface at point M.

In the presence of a prismatic defect at point M, the ray PMOQ transforms into ray P'MOQ by a deflection at point M of the surface. Physically this defect can be interpreted as a local variation in the surface slope.

Without the defect, the point P images on point Q following the main ray $\overline{PMOQ}$. With a prismatic defect at point M, the principal ray is deflected and now point P' images on Q, the vertical deviation is the deflection $\delta_y$ given by equation (1). $V_\phi$ and $V_m$ are respectively the visibilities of a defect in the phase and modulation maps of equations (4) and (5). The following relationships are important:

$$V_\phi = \begin{cases} \approx 1 & \text{for } S >> \\ \approx 0 & \text{for } S << \end{cases} \quad (7)$$

and $$V_m \approx 0 \text{ for any } S \quad (8)$$

Figure 5:
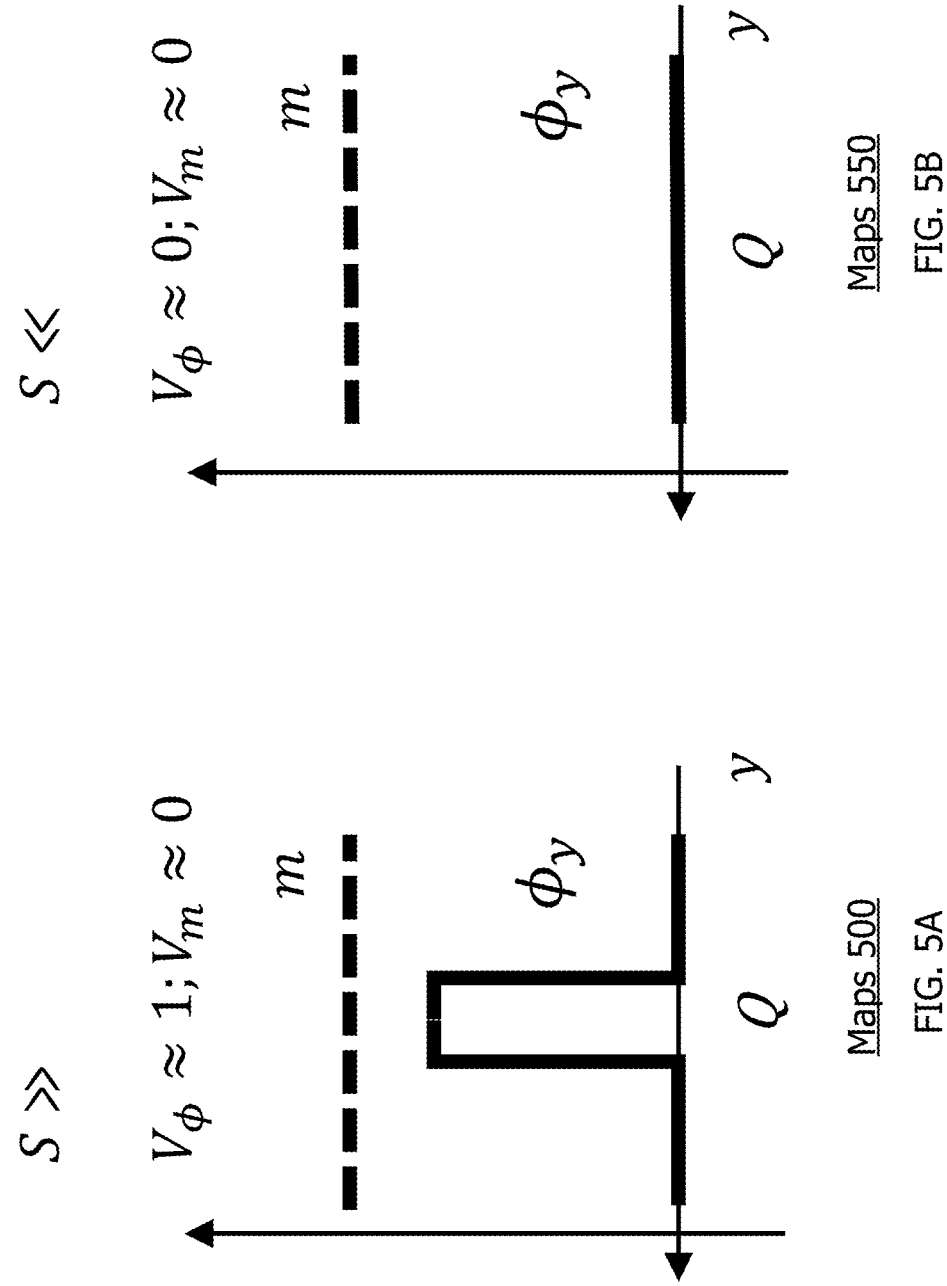
FIG. 5 shows phase and modulation maps at a neighborhood of image point Q of FIG. 4 for a prismatic defect.

For small sensitivities, S«, the visibility of the prismatic defect on the phase and modulation maps is small, such that $V_\phi \approx 0$ and $V_m \approx 0$. However, if the sensitivity is high, S», the visibility of a defect in the phase map will be significant, $V_\phi \approx 1$; meanwhile for the modulation, the visibility is small such that $V_m \approx 0$. In FIG. 5, this behavior is shown graphically.

FIGS. 5A and 5B show phase and modulation maps 500 and 550, respectively, at a neighborhood of image point Q of FIG. 4 for a prismatic defect. The phase $\phi_y$ corresponds to the solid line and the modulation m is represented by the dashed line. In FIG. 5A, the fringe period is small, p« and the sensitivity high S». FIG. 5B shows the same maps but using a big fringe period p» and low sensitivity S«.

Visibility of a Lenslet Defect in the Phase and Modulation Maps

Figure 6:
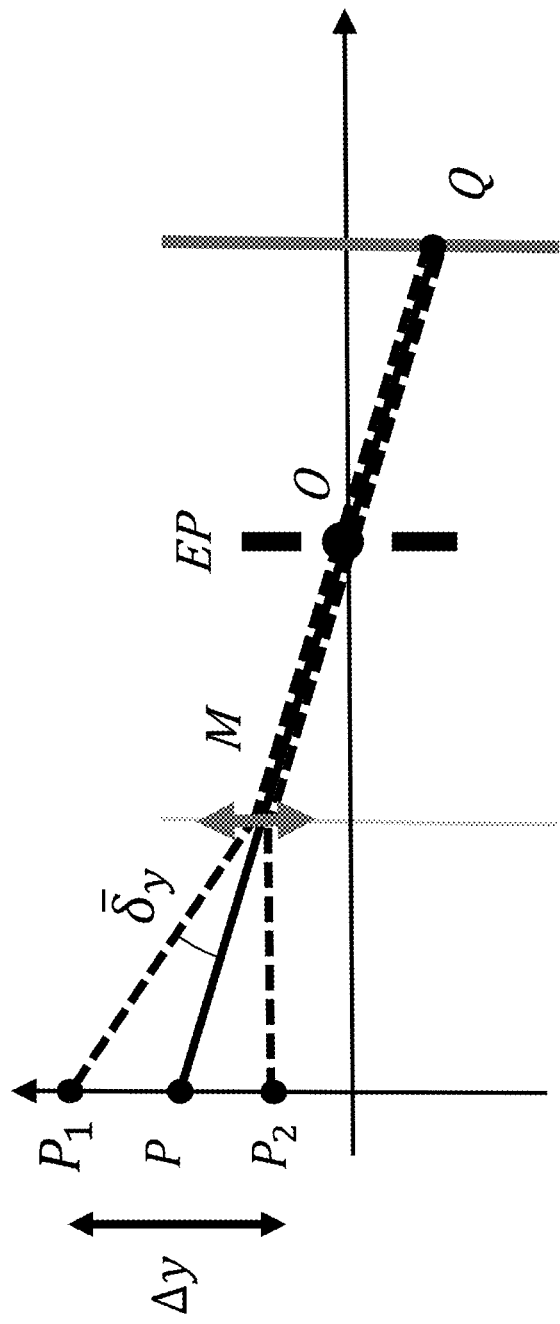
FIG. 6 illustrates a schematic 600 of how a lenslet defect integrates light coming from all points between $P_1$ and $P_2$ in a small area centered in image point Q in a phase measuring deflectometry configuration.

FIG. 6 illustrates a schematic 600 of how a lenslet defect integrates light coming from all points between $P_1$ and $P_2$ in a small area centered in image point Q in a phase measuring deflectometry configuration. The schematic 600 may be part of an AVI system that includes AVI devices, systems, configurations and methods described herein. A lenslet defect behaves like a small thin lens and has a transmittance close to 1, T(M)≈1. For this defect, the net effect is the integration of light coming from different directions into a small area centered in the same image point. In the image plane, the pixel size and the amount of defocus will determine this area around the image point. FIG. 6 depicts a lenslet defect, represented by the dark-grey double-arrow, located at point M of the surface under inspection. In the example shown in FIG. 6, point P images onto point Q. But the net effect of a lenslet defect integrates light coming from the region between $P_1$ and $P_2$ onto a small area around the image point Q. Physically, this defect can be interpreted as a bump, referred to as a positive power lenslet defect, or as a hole or pitch, referred to as a negative power lenslet defect. A scratch or an embedded long defect behaves like a one-dimensional lenslet defect. The lenslet defect integrates light coming from all points between $P_1$ and $P_2$ in a small area centered in image point Q. $\overline{\delta}_y$ is the maximum deviation from ray $\overline{PM}$ and $\Delta y$ is the lateral dimension of the area that integrates light onto a small area around point Q. The visibilities in the phase and modulation maps follow the relations $$V_\phi \approx 0 \text{ for any } S \quad (9)$$

and $$V_m = \begin{cases} \approx 1 & \text{for } S >> \\ \approx 0 & \text{for } S << \end{cases} \quad (10)$$

For big sensitivities, S«, the visibility of the lenslet defect on the phase and modulation maps is small, such that $V_\phi \approx 0$ and $V_m \approx 0$. However, if the sensitivity is high, S», the visibility of a defect in the modulation map will be significant, such that $V_m \approx 1$; meanwhile for the phase, the visibility will be small, such that $V_\phi \approx 0$. FIG. 7 show this behavior graphically.

Figure 7A:
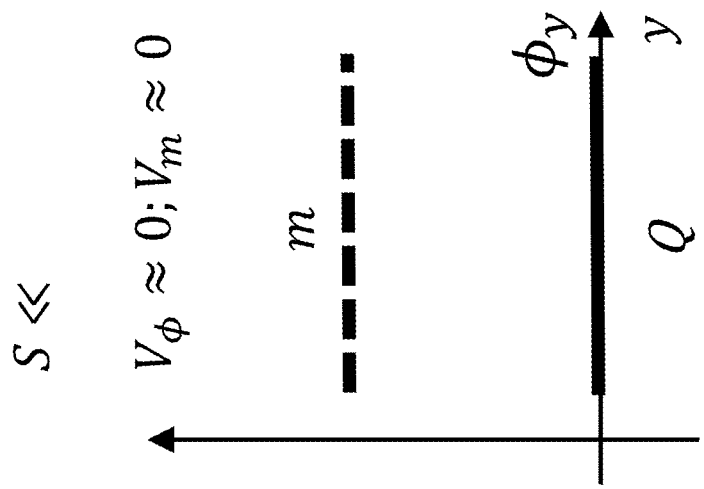
FIG. 7 shows phase and modulation maps at a neighborhood of image point Q of FIG. 6 for a lenslet defect.
Figure 7B:
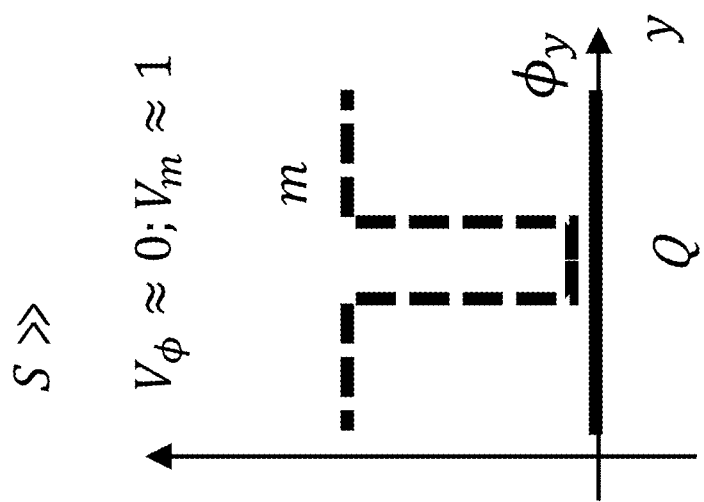

FIGS. 7A and 7B show phase and modulation maps 700 and 750, respectively, at a neighborhood of image point Q of FIG. 6 for a lenslet defect. The phase $\phi_y$ corresponds to the solid line, and the modulation m is represented by the dashed line. In FIG. 7A, the fringe period is small, p« and the sensitivity high S». In FIG. 7B, 5B shows the same maps but using big fringe period p» and low sensitivity S«.

For a fixed sensitivity, the visibility $V_m$ of a lenslet defect increases with the lateral size $\Delta y$ on the screen. For a real lenticular defect, $\Delta y$ depends on the maximum deflection $\overline{\delta}_y$ and its area. Therefore, the visibility of a lenticular defect in the modulation map depends on its area. Defects with larger areas present bigger visibilities in the modulation map. On the other side, when a human inspector evaluates a lens under reflection, the apparent brightness is an indicator used to classify a defect. From radiometric considerations, the apparent brightness of a defect observed in reflection increases with its area. Therefore, the apparent brightness and the visibility of the defect in the modulation map are related. This relation is significant. The system correlates the visibility of a defect in the modulation map with its luminous intensity when observed under reflection. Luminous intensity is a photometric quantity related with the perceived "brightness" of a small, point-like, source.

Visibility of a Transmissive Defect in the Phase and Modulation Maps

Figure 8:
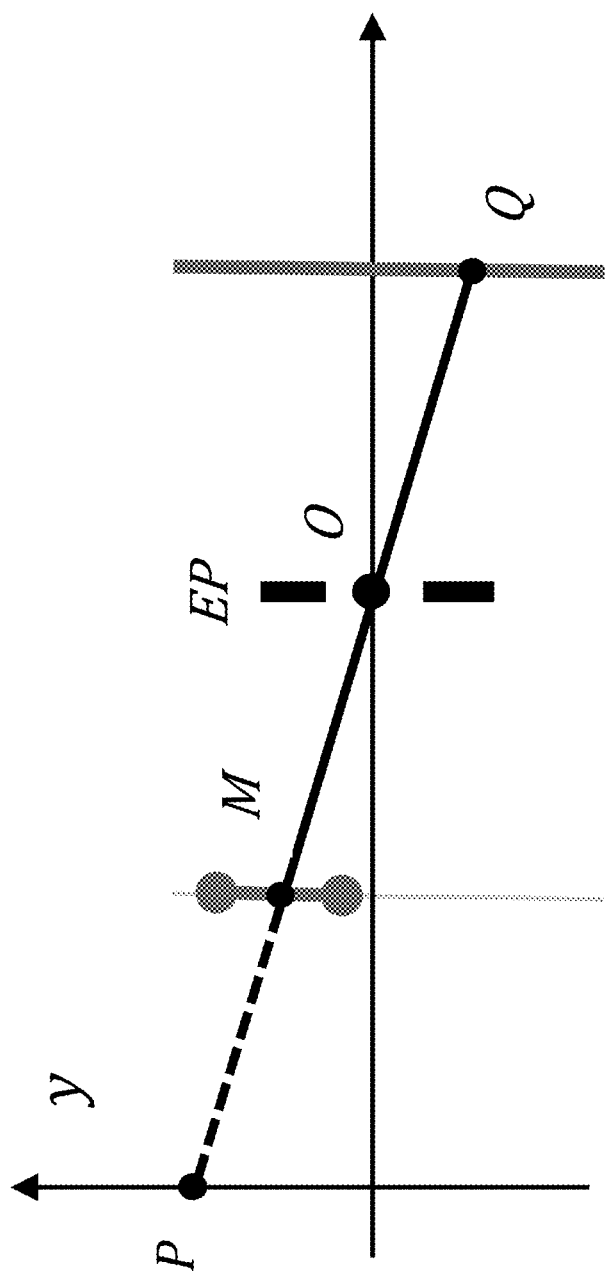
FIG. 8 illustrates a schematic 800 of how a transmissive defect does not deflect the principal ray $\overline{PMOQ}$ but reduces the intensity reaching image point Q because locally the transmittance is smaller than in its surroundings in a phase measuring deflectometry configuration.

FIG. 8 illustrates a schematic 800 of how a transmissive defect does not deflect the principal ray $\overline{PMOQ}$ but reduces the intensity reaching image point Q because locally the transmittance is smaller than in its surroundings in a phase measuring deflectometry configuration. The schematic 600 may be part of an AVI system that includes AVI devices, systems, configurations and methods described herein. A pure transmissive defect does not produce deflection and only changes the image intensity thought its transmittance T(M), see equation (2). FIG. 8 depicts a transmissive defect, represented by the vertical line with circle ends, located at point M of the plane surface under inspection. The effect of this type of defect is to reduce the intensity reaching point Q by a reduction in the local transmittance. Physically, this defect can be interpreted as dust or opaque particles on the lens surfaces. This defect does not deflect the principal ray $\overline{PMOQ}$ but reduces the intensity reaching image point Q because locally the transmittance is smaller than in its surroundings. Mathematically, for these type of defects T(M)<1.

Figure 9:
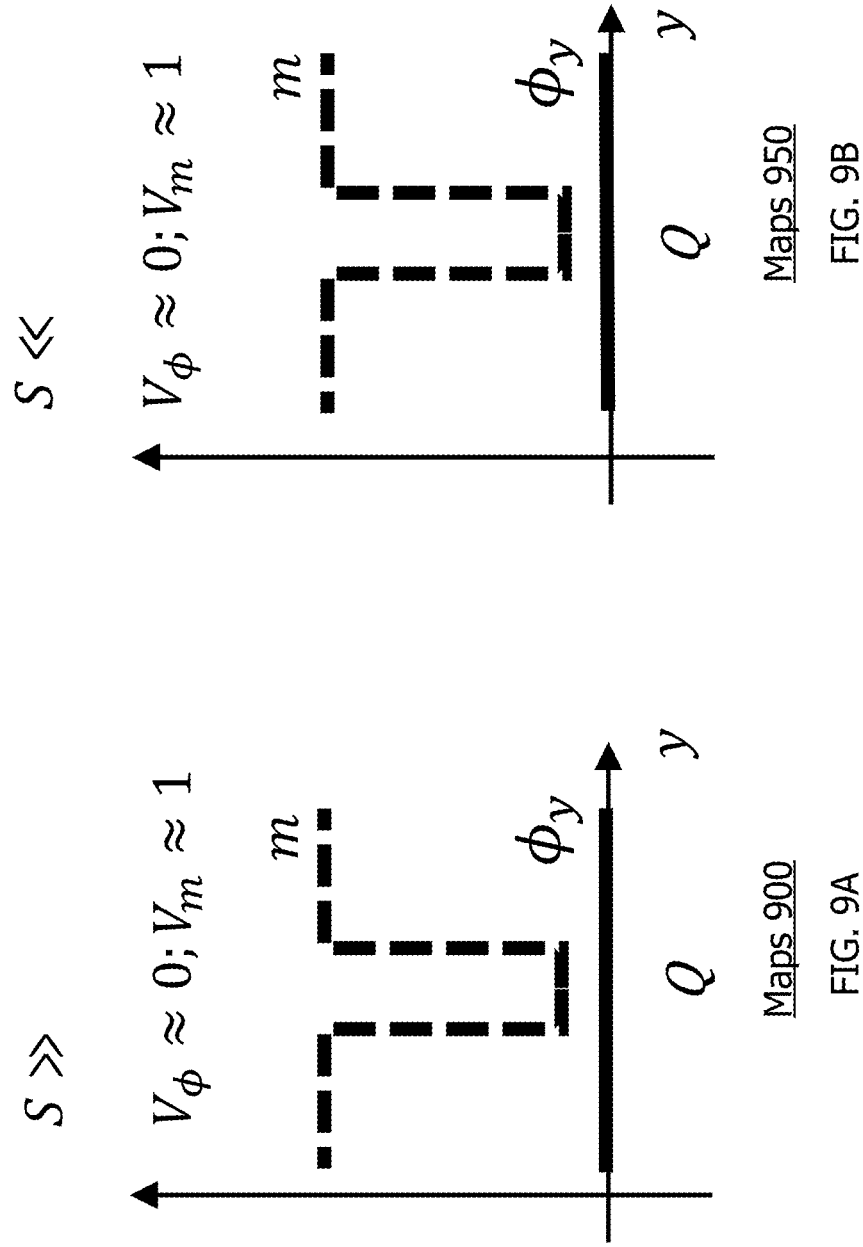
FIG. 9 shows phase and modulation maps at image point Q of FIG. 8 for a transmissive defect.

FIGS. 9A and 9B show phase and modulation maps 900 and 950, respectively, at image point Q of FIG. 8 for a transmissive defect. The phase $\phi_y$ corresponds to the solid line, and the modulation m is represented by the dashed line. As shown in FIG. 9A, the fringe period is small, such that p«, and the sensitivity is high, such that S». FIG. 9B shows the same maps using a big fringe period p» and low sensitivity S». For low transmittances the visibility of a transmissive defect on the phase map is given by $$V_\phi \approx 0 \text{ for any } S \quad (11)$$

while the visibility of the transmissive defect on the modulation map is $$V_m \approx 1 \text{ for any } S \quad (12)$$

FIGS. 9A and 9B show this behavior graphically.

Summary of the Different Types of Defects

Table 1 is a summary of the expected visibility values in the phase and modulation maps for the different types of defects and sensitivities discussed in the main text. The visibility in the phase and modulation maps for the different types of defects are shown as a function of the sensitivity of transmissive defects with low transmittance. Set A has small sensitivity and a long fringe period. Set B, has high sensitivity and a short fringe period.

TABLE 1

|  | Transmissive | Prismatic | Lenslet |
|---|---|---|---|
| A) S<<; p>> | $V_\phi \approx 0; V_m \approx 1$ | $V_\phi \approx 0; V_m \approx 0$ | $V_\phi \approx 0; V_m \approx 0$ |
| B) S>>; p<< | $V_\phi \approx 0; V_m \approx 1$ | $V_\phi \approx 1; V_m \approx 0$ | $V_\phi \approx 0; V_m \approx 1$ |

Differentiation Between Dust and Cosmetic Defects

The distinction between dust and real cosmetic defects is one of importance. Optical laboratories are industrial environments where it is challenging to avoid dust or dirt from settling on lens surfaces. Dust can be easily wiped out from the lens surface and does not constitute a cosmetic defect. However, dust and cosmetic defects may have the same appearance. For this reason, it is essential to distinguish between them at the production line. The failure to eliminate dust or dirt from the lens surfaces and the inability to differentiate dust or dirt from real surface defects has been one of the main causes of failure for previous attempts to create systems for automatic visual inspection of cosmetic defects.

Cosmetic defects typically behave like prism or lenslet defects. On the other hand, dust and particles on the surface behave like transmissive defects. Based on their different behavior on phase and/or modulation maps, it is possible to differentiate between actual cosmetic defects and dust/particles. Cosmetic defects may be differentiated from dust using two sets of fringe patterns, set A and set B. For the set A, a fringe pattern with a high spatial period is used. For this set, dust and dirt (transmissive defects) have excellent visibility on the modulation map (see the first row of Table 1, above). In contrast, the other defect types are not visible either in the modulation or phase maps. Therefore, the system can designate those areas appearing using set A as dust or particles on the surface. These defects can be ignored by the system and the system will not invalidate a semifinished or finished lens on this basis.

Set B has a small fringe period. In this case, we have high visibility for transmissive and lenslet defects in the modulation map. Additionally, prismatic defects appear with high visibility in the phase map instead of the modulation map. Thus, all defects that arise using set B and that were not previously marked as dust are classified as cosmetic defects. These defects can be used as a basis for invalidating a semifinished or finished lens. For example, one of these defects on the front surface but not on the back surface can be ignored and not be a basis for invalidating a semifinished lens. However, one of these defects on the front or the back surface can be a basis for invalidating a finished lens.

Distinction Between Back and Front Defects

The distinction between back and front defects is fundamental for the AVI system described herein. A defect on the back surface of a semifinished lens will be removed after surfacing, but if it is located on the front surface, it may be invalidating. For example, if a defect on the front surface is not permissible using a visual inspection standard, it will cause the finished or a semifinished lens to be invalidated. If a defect on the back surface is not permissible using a visual inspection standard, it may cause a finished lens to be invalidated, but it will have no importance for a semifinished lens.

Figure 10:
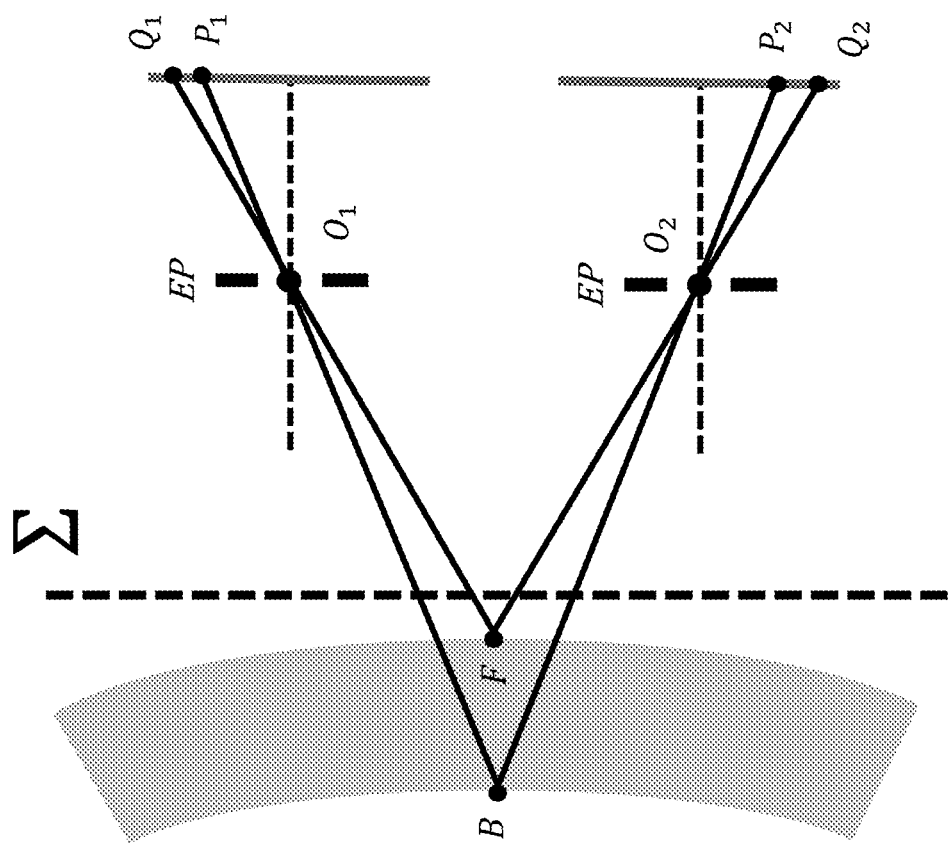
FIG. 10 shows a phase measuring deflectometry configuration used to determine if a defect is located on a front surface or a back surface of a lens using two cameras, which are represented by the optical centers $O_1$ and $O_2$.

For this purpose, a first strategy referred to as a triangulation method is implemented to determine the defect location based on the use of two or more views of the lens. First embodiments use two or more cameras to triangulate the position of the defects detected using the techniques mentioned above. FIG. 10 shows a phase measuring deflectometry configuration 1000 to determine if a defect is located on a front surface or a back surface of a lens using two cameras represented by the optical centers $O_1$ and $O_2$ and their respective entrance pupils, EP. Configuration 1000 may be part of an AVI system that includes AVI devices, systems, configurations and methods described herein. This embodiment captures images from two or more positions—points of view, optical centers, camera/lens poses or gazes—using two or more fixed cameras, or a single camera working on a movable camera holder to reposition the camera to the locations shown. Referring again to FIG. 10, points B and F represent two defects located on the back and front sides of the lens, respectively. Point B images on camera 1 and 2 as points $P_1$ and $P_2$ respectively. Points $Q_1$ and $Q_2$ are the images of point F on cameras 1 and 2. The cameras are calibrated so that the spatial position of point B with respect to $O_1$ can be calculated from the intersection of rays $\overline{O_1P_1}$ and $\overline{O_2P_2}$. For the point B, the position of its image is as observed through the lens. Point F can be triangulated also from rays $\overline{O_1Q_1}$ and $\overline{O_2Q_2}$. For all detected defects, the spatial position from the geometry shown in FIG. 10 is used to determine if that defect is in the front or the back side of the lens by measuring its distance to the calibrated arbitrary surface E. The calibrated surface E is usually selected close to the lens frontal vertex. Thus, from the normal distance of a defect position to the surface is immediate the discrimination between frontal and frontal defects. In other words, the discrimination between frontal and back side defects can be determined based on whether the normal distance of a defect position to the calibrated surface is close (for a frontal defect) or farther than a threshold distance (for a back side defect). Moreover, if the lens geometry and material are known beforehand, the system can calculate the defect depth in the lens body and a better classification of invalidating cosmetic defects can be made. Configuration 1000 may be described as frontal/back side discrimination from triangulation. For the triangulation of a defect location it is necessary to perform the calibration of the intrinsic parameters for both cameras and the extrinsic parameters between the cameras. Intrinsic parameters may include the focal distance, principal point and skew factor. The extrinsic parameters may describe the roto-translation between the coordinate systems of both cameras. The triangulation method can be implemented using two or more cameras or one camera and two or more lens positions offering a different gaze each.

Figure 11:
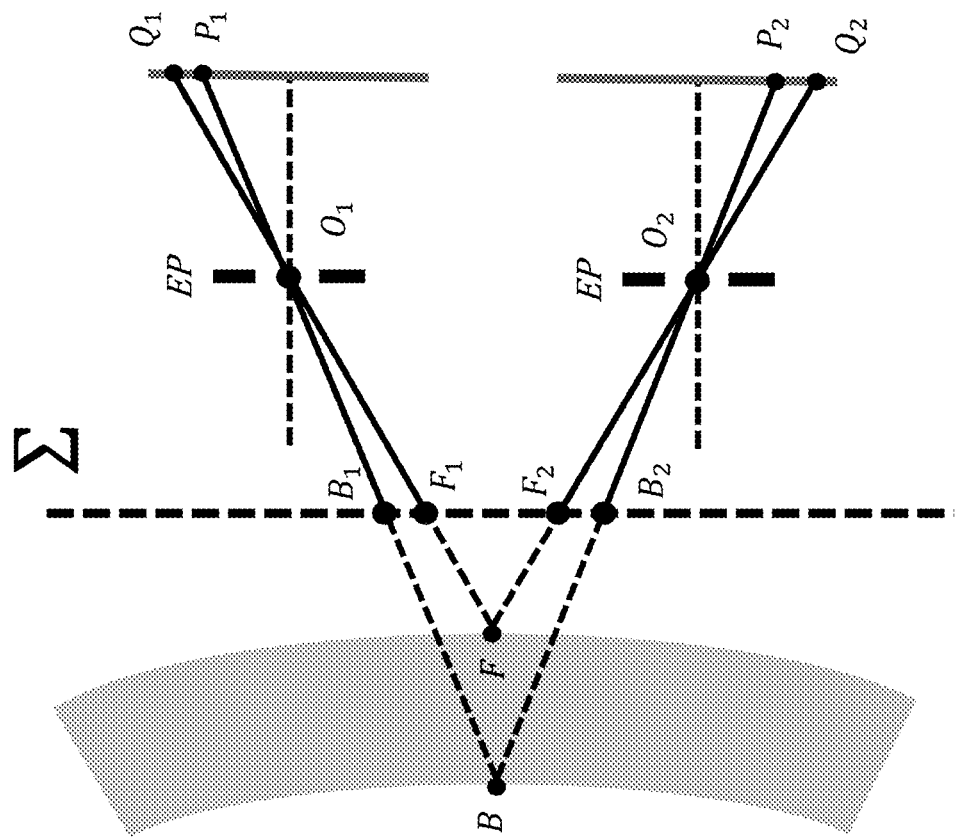
FIG. 11 shows a phase measuring deflectometry configuration used to determine if a defect is located on a front surface or a back surface of a lens using two cameras and a calibrated surface E.

A second strategy for front and back detection is referred to as the mapping method and does not need explicit camera calibration. The mapping method consists of the calculation of the mapping, $H_i\{\ \}$ that exists between each camera plane and a calibrated surface. For a plane surface, this mapping is a linear operator, a homography, but for a general reference surface, it is a non-linear mapping. FIG. 11 shows a phase measuring deflectometry configuration 1100 to determine if a defect is located on a front surface or a back surface of a lens using two cameras and a calibrated surface Σ. The two cameras are represented by the optical centers $O_1$ and $O_2$; and their respective entrance pupils, EP. Configuration 1100 may be part of an AVI system that includes AVI devices, systems, configurations and methods described herein. This embodiment captures images from two or more positions—points of view, camera centers, camera/lens poses or gazes—using two or more fixed cameras, or a single camera working on a movable camera holder to reposition the camera to the locations shown. In this case, the calibrated surface, Σ is a plane. Points $\{Q_1, Q_2\}$ and $\{P_1, P_2\}$ are the images of points B and F on cameras 1 and 2 respectively. Two homographies from camera 1 and 2 on the surface Σ identified by $H_1$ and $H_2$ are used to calculate the positions of points $B_1$ and $B_2$ on Σ as $B_1 = H_1[Q_1]$ and $B_2 = H_2[Q_2]$. For points $\{P_1, P_2\}$ the operation obtaining points $F_1 = H_1[P_1]$ and $F_2 = H_2[P_2]$ on the surface Σ is repeated.

From FIG. 11 it can be seen that measuring the distances $\overline{B_1 B_2}$ and $\overline{F_1 F_2}$ is used to determine if a defect is in the front or the back sides of the lens. Moreover, if the lens geometry and material are known beforehand, the system can determine the defect depth in the lens body and make a better classification of cosmetic defects. Configuration 1100 may be described as frontal/back side discrimination measuring disparity. The second strategy may be a front/back defect location from the defect disparity as seen from the at least two points of view. The mapping method can be implemented using two or more cameras; or one camera and two or more lens orientations, each lens orientation offering a different camera pose (lens gaze or point of view). For example, two different points of view, optical centers, camera/lens poses or gazes can be created by two cameras at two camera orientations with respect to a single lens orientation; by one camera moved to two orientations with respect to a single lens orientation; or by a single camera at one orientation with respect to a lens moved to two orientations with respect to the camera. A point of view or camera pose can be determined by the positions of the camera optical center and the orientations of the camera axis. It can also be determined by the distance of the optical center from and orientation of the axis with respect to the front surface of the lens.

Embodiments of the AVI System

Embodiments of an AVI system (device, kit, configuration or method) use the defect classification methods and/or systems discussed above, including the distinction between dust and cosmetic defects and the localization of the defect in the back or frontal sides of the lens and estimation of the defect luminous intensity and area. Referring back to FIG. 1, the embodiments of the AVI system include a screen for generating fringe patterns, a lens holder and a camera or set of cameras. The screen is a display, either static having a single fringe pattern or dynamic having several fringe patterns, that emits natural or polarized light. The screen can be a passive diffusive screen on which fringe patterns are projected from either side of the screen. The cameras are capable of capturing radiometric information. That is, they are sensitive to input irradiance. Alternatively, or additionally, the cameras are capable of capturing polarimetric information. That is, they are sensitive to the input irradiance and the polarization state of the light.

Figure 12:
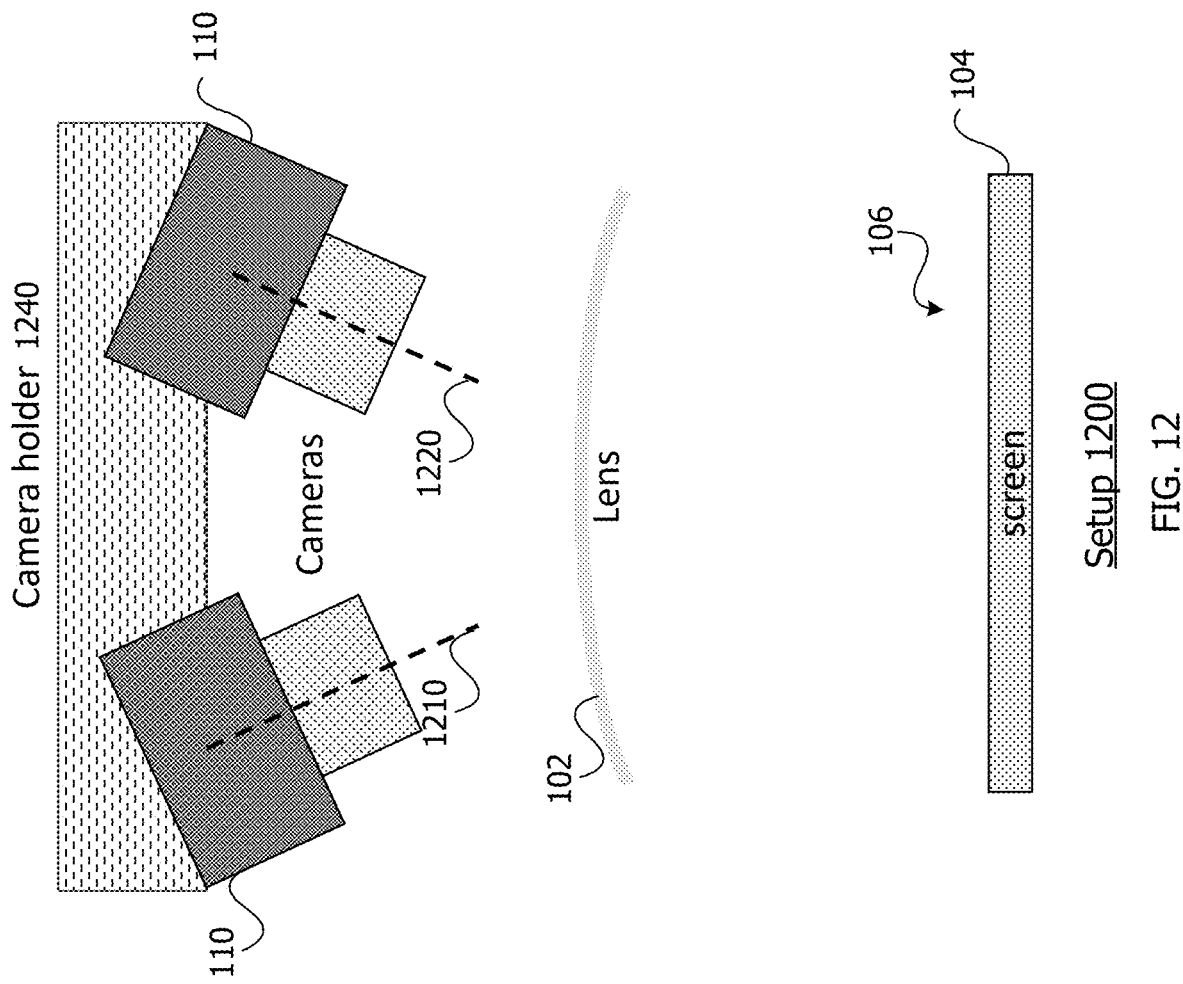
FIG. 12 shows a configuration of an AVI system having a stand-alone transmission deflectometry configuration using two or more cameras with the lens in a static position.

Referring now to FIG. 12, there is shown a configuration of an AVI system 1200 having a stand-alone transmission deflectometry configuration using two or more cameras 110 with the lens 102 in a static position. System 1200 may be an embodiment of an AVI system that includes AVI devices, systems, configurations and methods described herein. In this embodiment, the system captures images from two or more positions 1210 and 1220 using two or more fixed cameras, or a single camera working on a movable camera holder 1240 (optional) to reposition the camera to the locations shown. Positions 1210 and 1220 represent two points of view, optical centers, different camera/lens poses or gazes. The system captures the images shown on the screen 104 in transmission through the lens. The system embodiment depicted in FIG. 12 has two cameras 110 (or a single camera shown in two positions).

Figure 13:
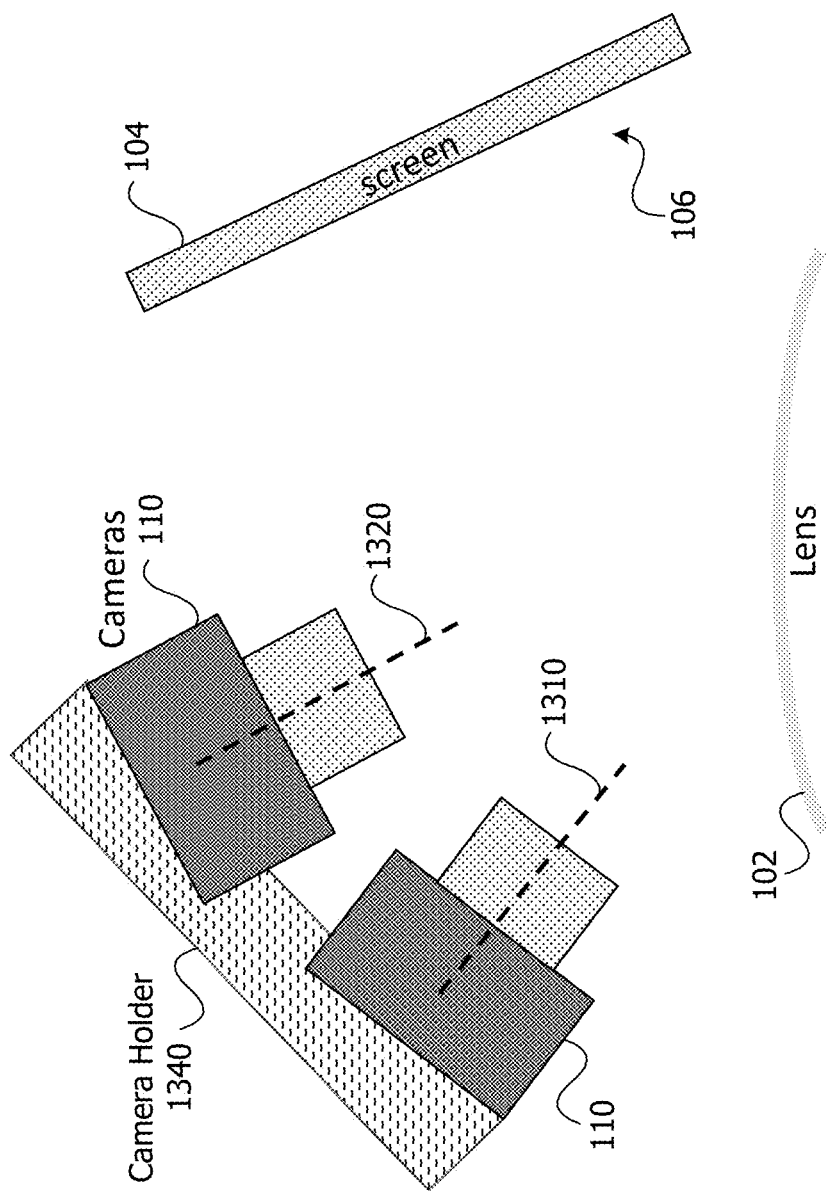
FIG. 13 shows a configuration of an AVI system having a stand-alone reflection deflectometry configuration using two or more cameras with the lens in a static position.

FIG. 13 shows a configuration of an AVI system 1300 having a stand-alone reflection deflectometry configuration using two or more cameras 110 with the lens 102 in a static position. System 1300 may be an embodiment of an AVI system that includes AVI devices, systems, configurations and methods described herein. In this embodiment the system captures images from two or more positions 1310 and 1320 using two or more fixed cameras, or a single camera working on a movable camera holder 1340 (optional) to reposition the single camera to the locations shown. Positions 1310 and 1320 represent two points of view, optical centers, different camera/lens poses or gazes. The system captures the images shown on the screen 104 after reflection on both surfaces of the lens. The system embodiment depicted in FIG. 13 has two cameras 110 (or a single camera shown in two positions).

Figure 14:
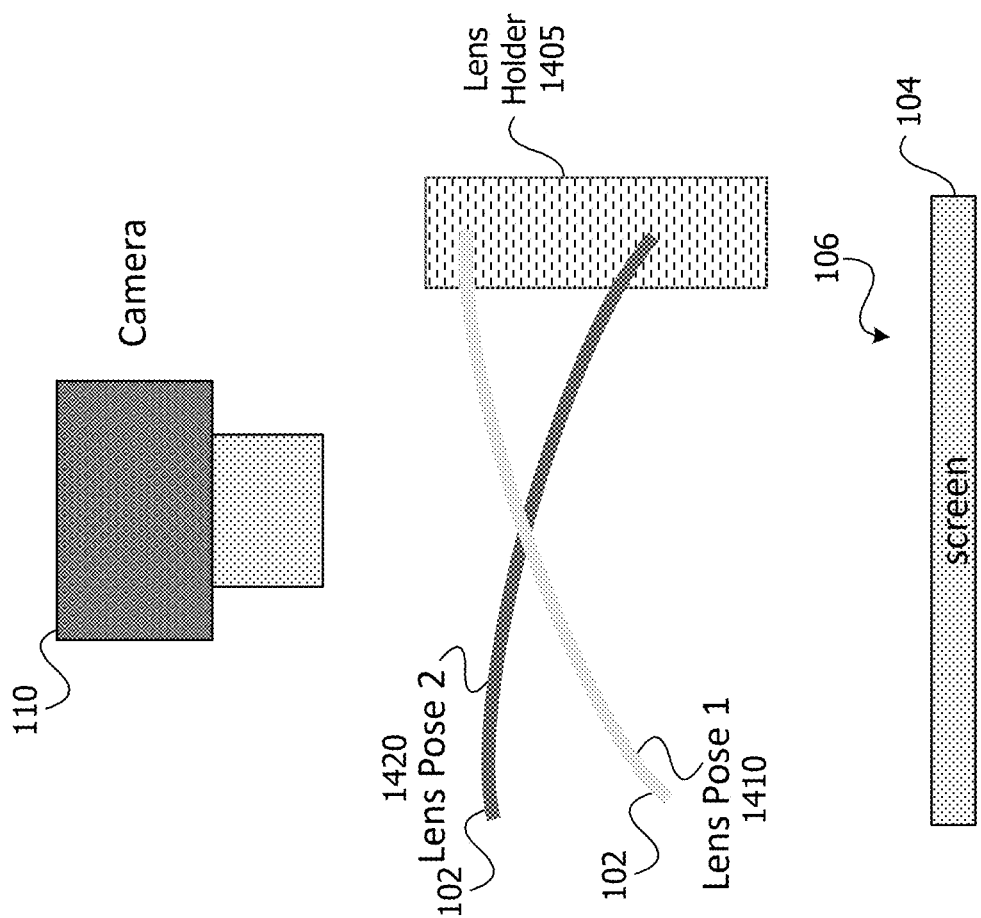
FIG. 14 shows a configuration of an AVI system having a stand-alone transmission deflectometry configuration using a movable lens holder and a single camera.

FIG. 14 shows a configuration of an AVI system 1400 having a stand-alone transmission deflectometry configuration using a movable lens holder 1405 and a single camera 110. System 1400 may be an embodiment of an AVI system that includes AVI devices, systems, configurations and methods described herein. The movable lens holder 1405 places the lens in two or more positions that permit the observation of the lens under different views 1410 and 1420 as shown. Views 1410 and 1420 represent two points of view, optical centers, different camera/lens poses, positions or gazes. The images shown on the screen 104 are captured in transmission through the lens. The system embodiment depicted in FIG. 14 has two lens orientations.

Figure 15:
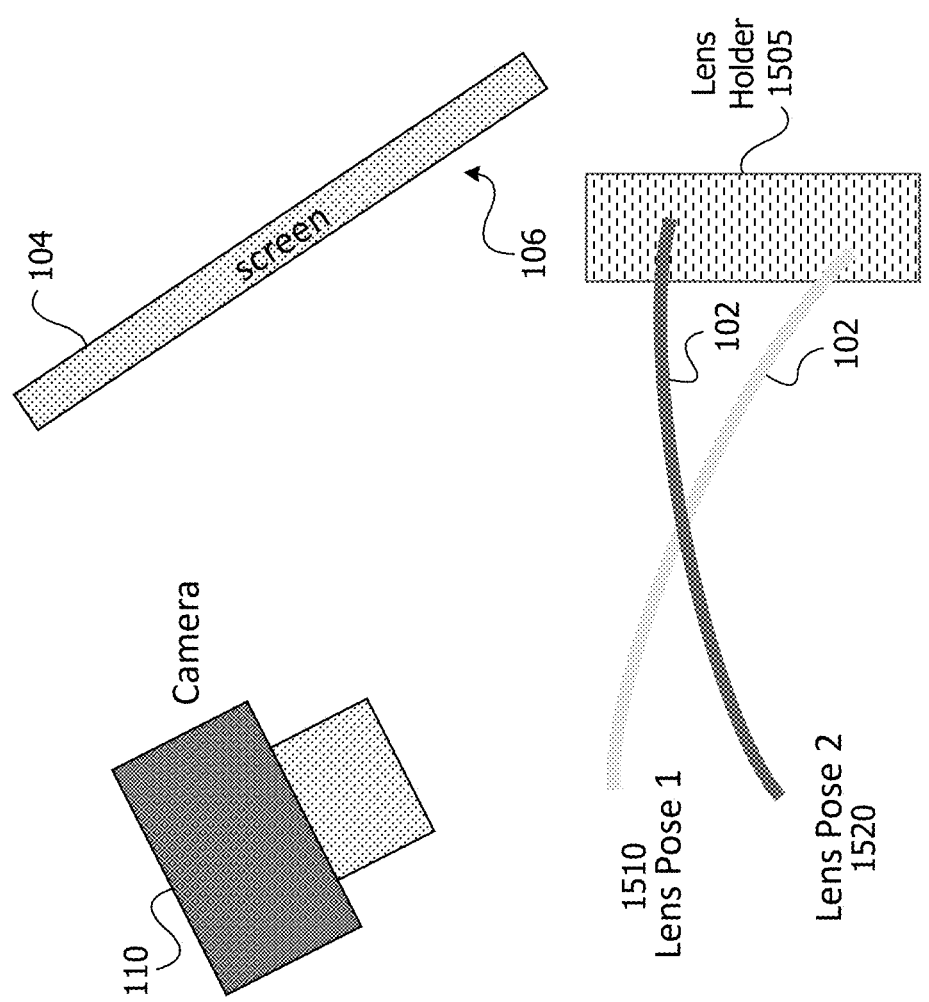
FIG. 15 shows a configuration of an AVI system having a stand-alone reflection deflectometry configuration using a movable lens holder and a single camera.

FIG. 15 shows a configuration of an AVI system 1500 having a stand-alone reflection deflectometry configuration using a movable lens holder 1505 and a single camera 110. System 1500 may be an embodiment of an AVI system that includes AVI devices, systems, configurations and methods described herein. The movable lens holder 1505 places the lens in two or more positions that permit the system to observe the lens under different views 1510 and 1520 as shown. Views 1510 and 1520 represent two points of view, optical centers, different camera/lens poses, positions or gazes. The system captures images shown on the screen 104 after reflection on both surfaces of the lens. The system embodiment depicted in FIG. 14 has two lens orientations.

Figure 16:
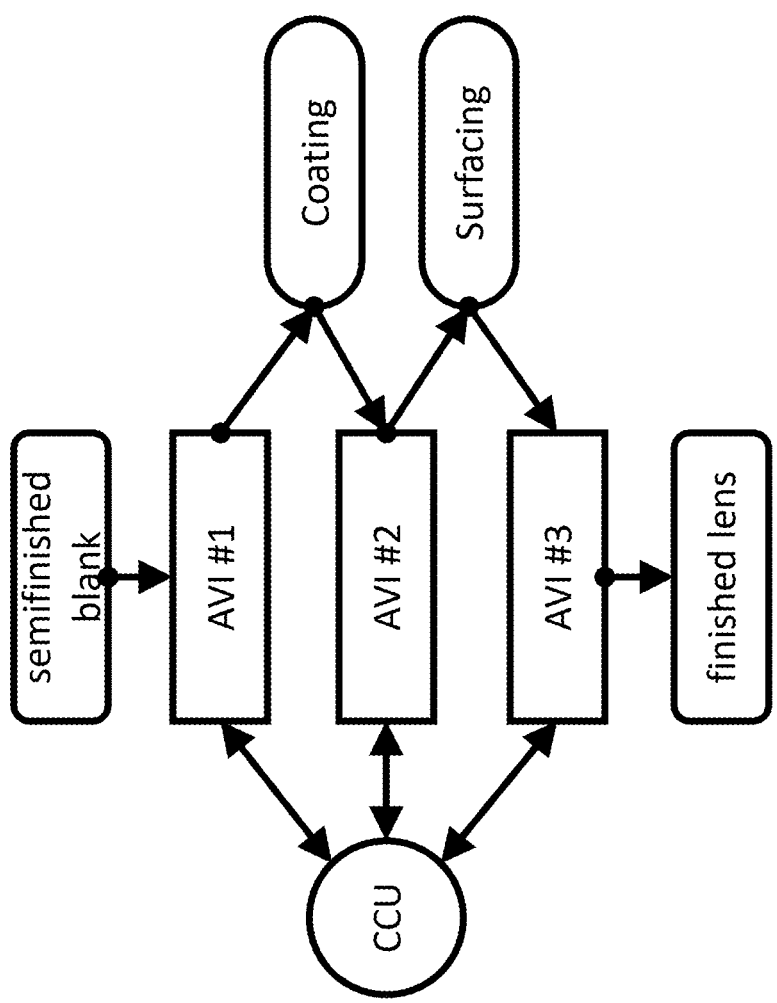
FIG. 16 is a block diagram of a lens production line having processing steps for a photochromic coating of the frontal surface and surfacing of the back surface; three AVI systems; and one CCU.

FIG. 16 is a block diagram 1600 of a lens production line having at least two processing steps (a photochromic coating of the frontal surface and surfacing of the back surface), three AVI systems, and one central control unit (CCU). Diagram 1600 depicts an embodiment of an AVI system that includes AVI devices, systems, configurations and methods described herein. Diagram 1600 uses the three AVI systems—AVI #1, AVI #2 and AVI #3—in a photochromic lens production line, to perform quality control inspection of cosmetic defects at three stages. The process starts with a semifinished blank, a standard semi-finished lens which is the substrate for coating. In some cases, the coating is photochromic. Instead, it can be a hard coating, an anti-reflective coating, or another known coating for a lens. A semifinished blank is provided to/received by to AVI #1 which performs a total quality control or an acceptance quality limit (AQL) analysis according to a visual inspection standard for surface defects in the frontal surface before being sent to the coating step. AQL can be defined as the "quality level that is the worst tolerable" in ISO 2859-1. It represents the maximum number of defective units, beyond which a batch is rejected. Manufacturers may set different AQLs for critical, major, and minor defects. For example, "AQL is 1.5%" means "no more than 1.5% defective items" are permissible, which may be based on a whole order quantity, an average over several production runs, etc. Following with the production line, in second place, the manufactured photochromic semifinished lenses are inspected by an AVI #2 for defects in the frontal coated surface. After the surfacing step and before sending a finished lens to the customer, the photochromic semifinished lenses are put through a final AQL analysis of cosmetic defects in the frontal side by AVI #3.

For semifinished lenses, importantly, a determination of whether the defects are at the frontal or the back surface is made. Back-surface defects will disappear during the lens surfacing process that generates the lens prescription, that is when creating the finished lens. For this reason, back-surface defects in the semifinished lens will not be present in the final mounted lens. On the other side, frontal surface defects that remain after the lens surfacing in the form of cosmetic defects may invalidate the semifinished lens from further processing.

Additionally, the spatial location of any defects on the front side of the lens is made. A large cosmetic defect on the front surface that is close to the edge has little importance because of the final edging that is performed later in processing to fit the finished lens to the frame. However, a small cosmetic defect at the center of the front surface can invalidate a semifinished lens because that defect will remain after the final edging.

On the other hand, for finished lenses, already glazed and ready for fitting in the frame, the distinction between front/back defects has no importance. In this case, the only requirement is to detect the defect, regardless of the surface it sits on. Thus, a defect on the front or back surface of an edged lens or at the center of a finished lens can invalidate that lens.

The system also differentiates between actual cosmetic defects and dust/dirt particles on the surface. Optical laboratories are industrial production environments where dust/dirt can appear quickly on the lens surface, and therefore, it is not uncommon that lenses have some dust on them. That is, the system cannot rely on having dust-free lenses for the AVI process.

Referring again to FIG. 16, the AVI systems can be placed at different locations of a lens production line and can be connected to a central control unit (CCU) for data aggregation and processing. For example, the AVI #1 system can make a total quality control or an AQL of the input semi-finished lenses, looking for frontal surface defects, but only those that affect the coating process (see below). The AVI #2 system may perform total quality control of the coating process, identifying cosmetic defects at the front surface of coated blanks. After surfacing, the AVI #3 system can make a total quality control or an AQL of the finished or near-finished lenses looking for invalidating cosmetic defects on any side of the lens. Additionally, the AVI #3 system can map the finished lens and perform quality control of the lens power.

In the embodiment described regarding FIG. 16, at each production step, the different AVI systems may use a different visual inspection standard. For example, based on data gathered from each AVI, the CCU may adapt the visual inspection standard of one particular AVI system. For this reason, the connections between the AVIs and the CCU are shown as a two-headed arrow such that information flows in both directions. For example, in the embodiment of FIG. 16, data received by the CCU from AVI #2 can allow for the learning of those defects on the frontal surface detected by the AVI #1 that remain after the coating. In this way, the CCU can adapt the AVI #1 visual inspection standard to focus the detection in only those types of frontal defects that do not disappear in the coating process. In some cases, the production line of FIG. 16 is a possible embodiment of the use of multiple AVI systems coordinated through a CCU using different visual inspection standards. It may represent a physical setup where all the units are located and wired at the same place and work at the same time. It may represent a logical setup where coating is done one day in one country or city; surfacing is done two days later in another country or city; and the CCU is located in a third country or city. It may be expanded to cover any generalization of this embodiment with N steps and M AVIs.

Pursuant to the example show in FIG. 16, the AVI #2 and #3 systems allow for the monitoring of the coating and surfacing processes. If the quality falls below a specific limit, the line can be stopped for maintenance. Also, quality trends and other manufacturing issues identified by the CCU can be used for programming maintenance stops of the production line. In this embodiment, a skilled inspector optionally supervises the classification results of an AVI system providing data to the CCU, allowing the CCU to learn the inspectors unwritten, implicit criteria for the assessment of the cosmetic quality of lenses. In this way, the AVI system 1600 of FIG. 16 allows for: defect monitorization along the production line for assessing the impact on the final product; the use of adaptive visual inspection standards along the production line using statistical and machine learning techniques; modeling and characterization of the production line using statistical and machine learning techniques for stability and cleanliness of the manufacturing line, quality stability for input the lenses, quality stability of the manufacturing process, determination of causes for the generation of defects and its correction.

Figure 17:
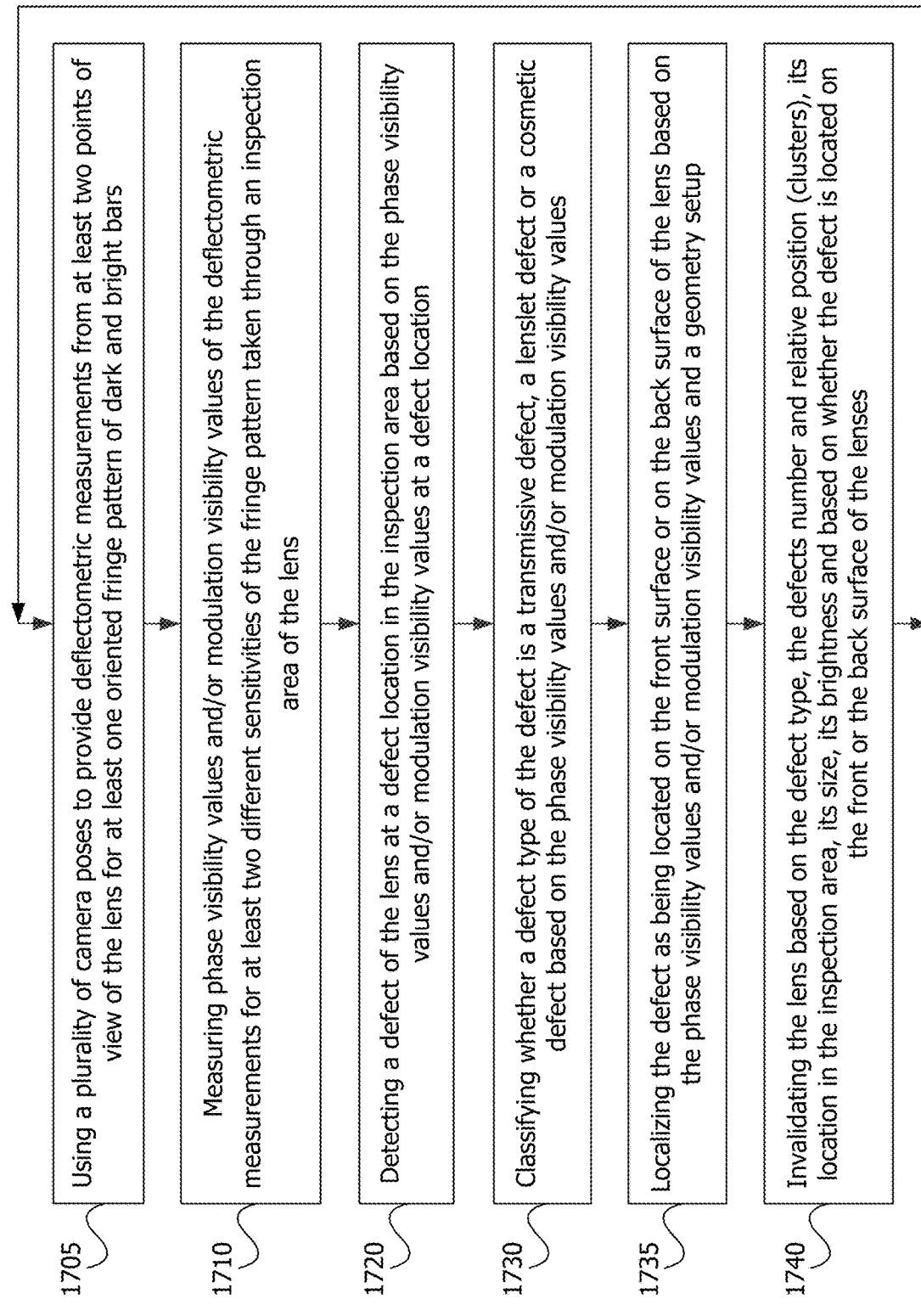
FIG. 17 is a flow diagram of an operating environment/process for automatic visual inspection of cosmetic defects in a transmissive lens, such as ophthalmic lens and optical elements.

FIG. 17 is a flow diagram of an operating environment/process 1700 for automatic visual inspection of cosmetic defects in a transmissive lens, such as ophthalmic lens and optical elements. The process 1700 may be performed by the any of the AVI systems described herein. The process 1700 may be part of or include any of the AVI methods described herein. The process 1700 starts at 1705 and can end at 1740, but the process can also be cyclical and return to 1705 after 1740. For example, the process may return to 1705 for re-inspection of a lens after cleaning dust or dirt off that was detected during inspection. It can also return to inspect another lens after inspection of a first lens. Process 1700 may be based on using measured fringe phase values and/or fringe modulation values, instead of the direct image for the estimation of the relative luminous intensity of a defect. The process 1700 starts at 1705 which is using a plurality of camera poses to provide deflectometric measurements from at least two points of view of the lens for at least one oriented fringe pattern of dark and bright bars. In some cases, the dark bars and bright bars have equal lateral thickness. In some cases, the bars are arranged in a sinusoidal fringe pattern. In other cases, various other oriented fringe patterns of dark and bright bars can be used. Using a plurality of camera poses at 1705 may include observing the screen through the lens for at least two points of view and a screen that is displaying the fringe pattern. Using a plurality of camera poses at 1705 may include observing the lens to provide deflectometric measurements from or of the lens as described herein. Using a plurality of camera poses at 1705 may include imaging the lens to use the fringe (dark and bright bars) phase and the fringe modulation for defect location.

After using a plurality of camera poses at 1705, the process moves to 1710 which is measuring phase visibility values and/or modulation visibility values of the deflectometric measurements for at least two different sensitivities of a deflectometric setup using at least one fringe pattern taken through an inspection area of the lens from the at least two points of view. Measuring at 1710 may include creating phase visibility value maps and/or modulation visibility value maps of the deflectometric measurements for a front and a back surface of the lens from the at least two points of view. Measuring at 1710 may include measuring phase visibility values and/or modulation visibility values of the deflectometric measurements from or of a lens as described herein.

In some cases, the measuring includes measuring the values of the deflectometric measurements for at least two different sensitivities of a deflectometric setup using at least one set of oriented fringe patterns of dark and bright stripes having different spatial periods that are displayed on a screen plane; and generating (i.e., calculating and showing) a map of the measured phase visibility values and a map of the measured modulation visibility values. This measuring may include obtaining images from two or more points of view to measure fringe phase values and fringe modulation values of the images, instead of the direct image for the estimation of the relative luminous intensity of a defect during detecting a defect at 1720. In other cases, the measuring includes measuring the values of the deflectometric measurements for at least two different sensitivities of a deflectometric setup using two sets of orthogonal (e.g., transverse, tangentially or right angle) x,y oriented fringe patterns of dark and bright stripes having different spatial periods; and the map so for the two sets of orthogonal x,y oriented fringe patterns.

After measuring at 1710, the process moves to 1720 which is detecting a defect of the lens at a defect location in the inspection area based on the phase visibility values and/or modulation visibility values at a defect location. Detecting at 1720 may include detecting a defect on one of the front surface or the back surface of the lens at a defect location in the inspection area based on the phase visibility values and/or modulation visibility values at the defect location as compared to the values of the inspection area. The inspection area may be a local neighborhood area immediately adjacent to and surrounding the defect location. Detecting at 1720 may include detecting relative luminous intensity of a defect in phase visibility value maps and/or modulation visibility value maps of the deflectometric measurements of a front and a back surface of the lens from the at least two points of view. Detecting at 1720 may include detecting defects using phase visibility values and/or modulation visibility values of the deflectometric measurements from or of a lens as described herein. In some cases, the detecting includes estimating a defect luminous intensity and a defect area of the defect based on the phase map and/or the modulation map; and classifying whether the defect is dust/dirt or cosmetic/functional defect based on the defect type, the defect luminous intensity, the defect area and its relative position.

After detecting at 1720, the process moves to 1730 which is classifying whether a defect type of the defect is a transmissive defect, a lenslet defect or a cosmetic defect based on the phase visibility values and/or modulation visibility values. Classifying at 1730 may include classifying a defect type based on the two sets of values at the defect location as compared to the values of a local neighborhood area and based on the visual inspection standard. Classifying at 1730 may include classifying using relative luminous intensity of a defect in phase visibility value maps and/or modulation visibility value maps of the deflectometric measurements of a front and a back surface of the lens from the at least two points of view. Classifying at 1730 may include classifying defect types using phase visibility values and/or modulation visibility values of the deflectometric measurements from or of a lens as described herein. In some cases, classifying at 1730 may include also classifying the defect as a cosmetic or functional defect depending on a visual inspection standard.

In some cases, the classifying includes differentiating whether the defect type is a transmissive defect (dust), a deflective (prismatic) defect or a lenslet (functional/cosmetic) defect using the phase map and/or the modulation map. The classifying may also include determining a ratio of whether the defect type has a transmissive, deflective/prismatic, or lenslet character of the detected defect using the phase map and the modulation map. Here, the system can calculate the ratio transmissive vs prismatic vs defective for given characteristics of the defect. In some cases, the classifying includes determining the depth of the defect within a body of the lens; and deciding whether the defect is located on the front surface or on the back surface of the lens based on the phase visibility values and/or modulation visibility values from the at least two points of view and a geometry of the lens orientation to the two points of view.

In some cases, the classifying includes using setups and fringe patterns with different sensitivities of a deflectometric setup that have a high sensitivity $S>20\pi$ and a low sensitivity $S<\pi$ that result in a high and a low sensitivity phase map and modulation map. Then, based on these maps, classifying the defect type is:
  a. a prismatic defect type when at the defect location ("at the defect location" may describe "around" or "close to" the defect location. Strictly speaking the visibility change may not be "at" but "around", or "with respect to the neighborhood" of the defect. It may also be at the inspection area):
     the high and low sensitivity modulation visibility maps show a change of 0,
     the high and low sensitivity phase visibility maps show a change of 1, and
  b. a lenslet defect type when at the defect location:
     the high and low sensitivity modulation visibility maps show a change of 1,
     the high and low sensitivity phase visibility maps show a change of 0; and
  c. a transmissive defect type when at the defect location:
     the high and low sensitivity modulation visibility maps show a change of 0,
     the high and low sensitivity phase visibility maps show a change of 0.

In some cases, the high and low sensitivities are created by a first set of dark and bright stripes for S» having S>20π and p=4 mm; and a second set of dark and bright stripes for S« having S<π, p=420 mm.

After classifying at 1730, the process moves to 1735 which is localizing the defect as being located on the front surface or on the back surface of the lens based on the phase visibility values and/or modulation visibility values and a geometry configuration. Localizing at 1735 may include localizing based on the phase visibility values and/or modulation visibility values from the at least two points of view and a geometry of the lens orientation to the two points of view. Localizing at 1735 may include localizing defects using phase visibility values and/or modulation visibility values of the deflectometric measurements from or of a lens as described herein.

In some cases, the localizing includes at least two points of view using two camera poses, estimating a defect luminous intensity of the defect based on the fringe modulation deflectometric measurements, creating a phase map of fringe phase deflectometric measurements from the at least two points of view and creating a modulation map of fringe modulation deflectometric measurements from the at least two points of view. Then, localizing the defect on the front or back surface based on the phase map and the modulation map.

In some cases, the localizing is based on discriminating that the defect location is on the front or back surface from the defect disparity as seen from the at least two points of view. It may also or alternatively be based on discriminating that the defect location is on the front or back surface from a triangulation of the defect position as seen from the at least two points of view (e.g., different camera/lens poses or a different gaze of each camera or point of view).

After localizing at 1735, the process moves to 1740 which is invalidating the lens based on whether the defect is a cosmetic defect type, the defects number and relative position (clusters), its location in the inspection area, its size, its brightness and based on whether the defect is located on the front or the back surface of the lenses. Various examples of the numbers of defects, locations, sizes and/or brightness that distinguish the defect type are considered. These examples may be based on or may be part of various visual inspection standards. For example, a 75 mm diameter semifinished lens can be divided in three zones 1, 2 and 3. Zone 1 is the 30 mm diameter central disk, zone 2 is the annular region between diameters 30 and 66 mm and zone 3 is the annular region between diameter 66 mm and the lens border at 75 mm. A lens is considered correct if the front surface has less than 4 cosmetic defects smaller than 0.1 mm with a brightness bellow 0.5 in zone 1 and less than 4 cosmetic defects smaller than 0.2 mm and a brightness bellow 0.5 in zone 2. Brightness can be defined in terms of the normalized modulation between 0 and 1 in arbitrary units. There can be any number of defects smaller than 0.05 mm in zones 1 and 2 unless clustered. A cluster can be defined as two defects that are closer than 5 mm. Invalidating at 1740 may include invalidating a lens based on phase visibility values and/or modulation visibility values of the deflectometric measurements from or of a lens as described herein. In some cases, the invalidating at 1740 includes invalidating a lens if the AVI system detects a defect that is:

A. a cosmetic defect type on the front surface of the semifinished lenses but not a defect that is a transmissive defect type on the front surface of the semifinished lenses and not a defect that is on the back surface of the semifinished lenses;

B. a cosmetic defect type on the front surface of the coated blank lenses but not a defect that is a transmissive defect type on the front surface of the coated blank lenses and not a defect that is on the back surface of the coated blank lenses; or C. a cosmetic defect type on the front surface or the back surface of the ophthalmic finished lenses but not a defect that is a transmissive defect type on the front surface or the back surface of the ophthalmic finished lenses.

In some cases, the invalidating at 1740 includes invalidating a lens if the AVI system detects a defect that is:

A. a semifinished lenses having a defect on a frontal surface that is not permissible using first visual inspection standard that is a total quality control standard, or an Acceptance Quality Limit standard;

B. a coated blank lens having a defect on a frontal surface that is not permissible using a second visual inspection standard that is a total quality control standard, or an Acceptance Quality Limit standard; or C. an ophthalmic finished lens having a defect on a frontal or a back surface that is not permissible using a third visual inspection standard that is a cosmetic defect detecting standard, a total quality control standard, or an Acceptance Quality Limit standard.

In some versions of the system, the invalidating includes an invalidating system having a defect warning having a light, a sound, a display message and/or a network message transmission indicating: detection of the defect, identification of the defect type of the defect and the surface the defect is on, and identification of which lens has the defect.

In some versions of the system, prior to using a plurality of camera poses at 1705, a calibration process of the AVI system is performed. The process may include using the system without the lens or removing the lens from the at least two points of view. Without the lens the system is used to measure the phase visibility values and/or modulation visibility values of the deflectometric measurements for the different sensitivities from the at least two points of view.

Then, determining the phase visibility values and/or modulation visibility values taken with the lens includes using the measured phase visibility values and/or modulation visibility values taken without the lens. That is, the phase visibility values and modulation visibility values without the lens can be used to obtain values for calculating sensitivities and modulation base values for the AVI system that are used to calculate the phase visibility values and modulation visibility values taken with the lens.

Figure 18:
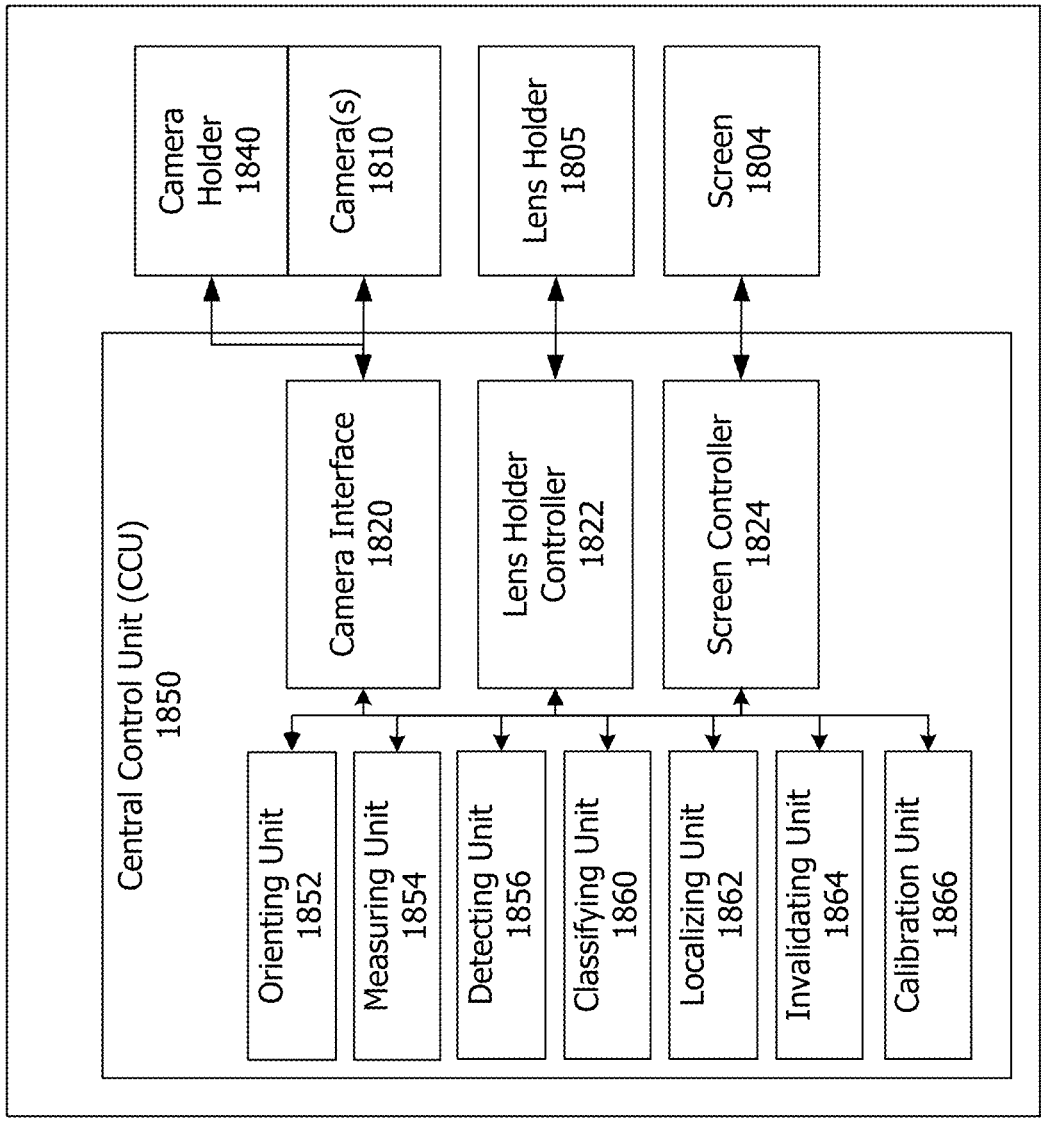
FIG. 18 is a block diagram of an AVI system for automatic visual inspection of cosmetic defects in a transmissive lens, such as ophthalmic lens and optical elements.

FIG. 18 is a block diagram of an AVI system 1800 for automatic visual inspection of cosmetic defects in a transmissive lens, such as ophthalmic lens or an optical element. The system 1800 may perform process 1700 or any other AVI inspection process described herein. The system 1800 may include, be, or be part of any of the AVI devices, systems, configurations and methods described herein. The system 1800 includes one or more camera(s) 1810 for providing points of view and receiving images as noted herein. Camera(s) 1810 may be one or more cameras such as camera 110 or otherwise as noted herein. The system 1800 includes camera holder 1840 to position and/or move a camera as noted herein. Camera holder 1840 may be a camera holder as noted herein. The system 1800 includes camera interface 1820 for controlling camera(s) 1810 for providing points of view and images as noted herein and/or camera holder 1840 to be used as noted herein. The system 1800 includes lens holder 1805 to position and/or move a lens with respect to camera(s) 1810 and screen 1804 as noted herein. Lens holder 1805 may be a lens holder as noted herein. The system 1800 includes lens holder controller 1822 for controlling lens holder 1805 for controlling positioning and/or moving of a lens with respect to camera(s) 1810 and screen 1804 as noted herein. The system 1800 includes screen 1804 for providing one or more fringe patterns to be imaged by camera(s) 1810 as noted herein. Screen 1804 may be a screen such as screen 104 or otherwise as noted herein. The system 1800 includes screen controller 1822 for controlling screen 1804 to provide one or more fringe patterns to be imaged by camera(s) 1810 as noted herein.

System 1800 also has central control unit (CCU) 1850 for controlling interface 1820, controller 1822 and/or controller 1824. CCU 1850 also performs other control and processing based on images from the camera(s) and information received form interface 1820, controller 1822 and/or controller 1824. CCU 1850 includes orienting unit 1852 which is configured to perform orienting of a lens to provide deflectometric measurements 1705 shown in and described regarding FIG. 17. The orienting 1705 may include control or movement of camera(s) 1810 using interface 1820; control or movement of lens holder 1805 using controller 1822; and/or control or movement of screen 1804 using controller 1824. The orienting 1705 may include receiving or be based on data from calibration unit 1866. CCU 1850 also includes measuring unit 1854 which is configured to perform measuring of phase and/or modulation visibility values 1710 shown in and described regarding FIG. 17. The measuring 1710 may include focus of, activation of and receiving images from camera(s) 1810 using interface 1820; moving lens holder 1805 using controller 1822; and/or control of and displaying fringe patterns on screen 1804 using controller 1824. The measuring 1710 may include receiving or be based on orientation data received from orientation unit 1852.

Referring again to FIG. 18, CCU 1850 includes detecting unit 1856 configured to perform detecting of a defect 1720 shown in and described regarding FIG. 17. The detecting 1720 may include receiving or be based on phase and/or modulation visibility values received from measurement unit 1854. It may also include receiving or be based on orientation data received from orientation unit 1852.

CCU 1850 includes classifying unit 1860 which is configured to perform classifying of a defect type 1730 shown in and described regarding FIG. 17. The classifying 1730 may include receiving or be based on phase and/or modulation visibility values received from measurement unit 1854 and/or from detecting unit 1856.

CCU 1850 also includes localizing unit 1862 which is configured to perform localizing of a defect surface 1735 shown in and described regarding FIG. 17. The localizing 1735 may include receiving or be based on phase and/or modulation visibility values received from measurement unit 1854 and/or from detecting unit 1856. The localizing 1735 may include receiving or be based on a geometries, planes and/or distances: a) of the of camera(s) 1810 received from interface 1820; b) of lens holder 1805 received from controller 1822; and/or c) of screen 1804 received from controller 1824. The geometry, planes and distances may include those referred to in FIGS. 11 and 12.

CCU 1850 includes invalidating unit 1864 which is configured to perform invalidating of a lens 1740 shown in and described regarding FIG. 17. The invalidating 1740 may include receiving or be based on a defect type and surface of the defect received from classifying unit 1860 and from localizing unit 1862. The invalidating 1740 may include receiving or be based on a visual inspection standard and/or phase and/or modulation visibility values received from measurement unit 1854 and/or from detecting unit 1856.

CCU 1850 includes calibration unit 1866 which is configured to perform calibrating of cameras as noted for process 1700. The calibration may include receiving or be based on orientation data received from orientation unit 1852. It may also include receiving or be based on phase and/or modulation visibility values received from measurement unit 1854.

The AVI systems and/or methods described herein are suitable for inspecting various types of optical elements like ophthalmic lenses. This includes spectacle lenses, contact lenses, intraocular lenses, lenses for goggles, insert lenses, and other lenses for face shields, respirators, helmets, eye shields and other face-mounted gear. They may also be used to inspect contact lenses and intraocular lenses. For some embodiments described herein, the lens is optional. For example, the descriptions herein may apply to an AVI method, system, configuration, kit or production line product that can be purchased and configuration to inspect lenses as described herein.

ADVANTAGES

Benefits of the AVI systems and/or methods described herein include reducing the number of skilled operators needed for manning the inspection processes. Inspection time is reduced, and inspection consistency will be increased. The AVI system makes possible the real-time statistical modeling of the production line. Installed AVI systems may also be easily updated to add new quality standards and features. For end users, the AVI system complements products and services that are offered to the optical industry, such as to implement a click-fee ophthalmic lens production line model.

The AVI systems and/or methods described herein permit the quality control of semifinished lenses with or without extra layers, caps, coatings, or whatever structure used to control or modify the semifinished lens properties. Some advantages of the defect inspection of the AVI system include:

1) Implementation of any explicit, written visual inspection standard or defect grading standard used for the assessment of the cosmetic quality of a lens.
2) Automatic location of the defects on the back or front surfaces of the lens.
3) Automatically implement, as a machine learning process, the implicit, unwritten criteria used by a skilled inspector for assessment of the cosmetic quality of a lens.
4) Ensure that the evaluation of the lens surface quality, in terms of visually permissible defects, is consistent throughout the lab network.
5) In the case of assisted operation prevent inspector fatigue.
6) Model production characteristics with statistical or machine learning methods for:
   a. Measuring trends in the cleanliness of the production line
   b. Measuring trends in the lens quality
   c. Measuring stability of the production line
   d. Determination of causes for the defects The quality control can be total or an AQL analysis for checking the manufactured batches before sending the product to the final customer.

There are also advantages of the cosmetic defect inspection of finished lenses by the AVI system. In this case, the lens is already surfaced and finished from a semifinished blank. The product can contain extra layers, caps, coatings, or whatever structure used to control or modify the lens properties. The quality control can be total or realized as an AQL analysis for checking manufactured batches. Here, main advantages are the same that of purpose No 1 above (Implementation of any explicit, written visual inspection standard or defect grading standard used for the assessment of the cosmetic quality of a lens) with the exception that the defect location if the front or backside of the lens is irrelevant for finished lenses.

Another benefit of the systems and/or methods described herein is quality control of lens power. Additional to the detection of cosmetic defects, the AVI system described can be used as a lens mapper, adding an extra feature to the system.

Figure 19:
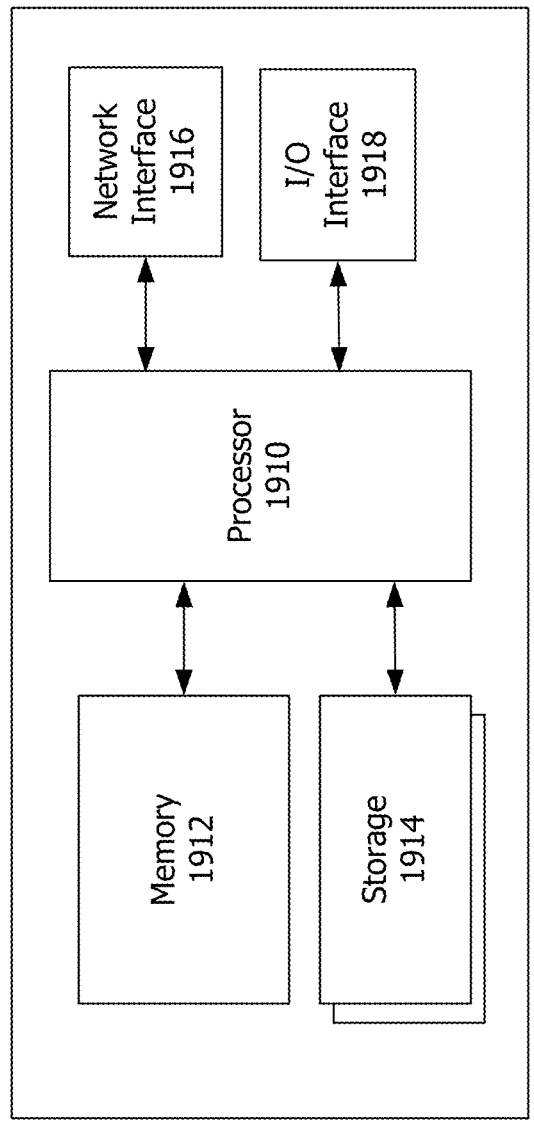
FIG. 19 is a block diagram of a computing device.

FIG. 19 is a block diagram of a computing device 1900. The computing device 1900 may be representative of any of the components of an AVI system or method herein (such as part of any of AVI systems 100, 150, 1000-1600 and/or method 1700). Device 1900 may be the CCU of diagram 1600 or CCU 1850. Device 1900 may be a specialized computing device that is part of an AVI system and/or method as noted herein. It may control other components of the system and/or method. In some cases, the computing device 1900 may be a desktop or laptop computer, a server computer, a computer workstation, or other computer. The computing device 1900 includes software and/or hardware for providing functionality and features described herein. These computing devices may run an operating system, including variations of the Linux, Microsoft Windows, and Apple Mac operating systems. The techniques may be implemented with machine readable storage media in a storage device included with or otherwise coupled or attached to a computing device.

The computing device 1900 may include one or more of logic arrays, memories, analog circuits, digital circuits, software, firmware and processors. The hardware and firmware components of the computing device 1900 may include various specialized units, circuits, software and interfaces for providing the functionality and features described herein. For example, device 1900 may perform control and processing of an AVI system or method herein. This includes invalidating a lens as noted herein, such as at invalidating 1740 or unit 1864.

The computing device 1900 has a processor 1910 coupled to a memory 1912, storage 1914, a network interface 1916 and an I/O interface 1918. The processor 1910 may be or include one or more microprocessors, field programmable gate arrays (FPGAs), application specific integrated circuits (ASICs), programmable logic devices (PLDs) and programmable logic arrays (PLAs). The memory 1912 may be or include RAM, ROM, DRAM, SRAM and MRAM, and may include firmware, such as static data or fixed instructions, BIOS, system functions, configuration data, and other routines used during the operation of the computing device 1900 and processor 1910. The memory 1912 also provides a storage area for data and instructions associated with applications and data handled by the processor 1910, such as data and instructions associated with the control and processing of an AVI system or method herein. As used herein the term "memory" corresponds to the memory 1912 and explicitly excludes transitory media such as signals or waveforms.

The storage 1914 provides non-volatile, bulk or long-term storage of data or instructions in the computing device 1900, such as data and instructions associated with the control and processing of an AVI system or method herein. The storage 1914 may take the form of a magnetic or solid state disk, tape, CD, DVD, or other reasonably high capacity addressable or serial storage medium. Multiple storage devices may be provided or available to the computing device 1900. Some of these storage devices may be external to the computing device 1900, such as network storage or cloud-based storage. As used herein, the terms "storage" and "storage medium" correspond to the storage 1914 and explicitly exclude transitory media such as signals or waveforms. In some cases, such as those involving solid state memory devices, the memory 1912 and storage 1914 may be a single device. The memory 1912 and/or storage 1914 can include an operating system executing the data and instructions associated with the control and processing of an AVI system or method herein.

The network interface 1916 includes an interface to a network such as a network that can be used to communicate network packets, network messages, telephone calls, faxes, signals, streams, arrays, and data and instructions associated with the control and processing of an AVI system or method herein. The network interface 1916 may be wired and/or wireless. The network interface 1916 may be or include Ethernet capability.

The I/O interface 1918 interfaces the processor 1910 to peripherals (not shown) such as displays, video and still cameras, microphones, user input devices (for example, touchscreens, mice, keyboards and the like). The I/O interface 1918 interface may support USB, Bluetooth and other peripheral connection technology. In some cases, the I/O interface 1918 includes the peripherals, such as displays and user input devices, for user accessed to data and instructions associated with the control and processing of an AVI system or method herein to perform any of the actions noted in FIGS. 1A-18.

In some cases, storage 1914 is a non-volatile machine-readable storage medium that includes computer readable media, including magnetic storage media, optical storage media, and solid state storage media. It should be understood that the software can be installed in and sold with an AVI system or method herein and/or the other published content or components of and AVI system or method. Alternatively, the software can be obtained and loaded into the data and instructions associated with the AVI system or method herein, including obtaining the software via a disc medium or from any manner of network or distribution system, including from a server owned by the software creator or not owned but used by the software creator. The software can be stored on a server for distribution locally via a LAN and/or WAN, and/or to another location via a WAN and/or over the Internet.

By providing data and instructions associated with the control and processing of an AVI system or method herein, those data and instructions increase computer efficiency because they provide a quicker, automated and more accurate detection of defects in lenses or other optical material as noted herein. They, in fact, provide better AVI systems and methods as noted herein.

Each of units 1852-1866 may be or include hardware circuitry, BIOS, ROM, an OS, computer instructions and/or a computing unit. These units may be hardware, software, firmware, or a combination thereof. Additional and fewer units, modules or other arrangement of software, hardware and data structures may be used to achieve the processes and apparatuses described herein.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for automatic visual inspection of defects in a transmissive lens comprising:
    measuring phase visibility values and modulation visibility values of deflectometric measurements for at least two different sensitivities of a deflectometric setup using at least one fringe pattern taken through an inspection area having a front and back surface of the lens from at least two points of view,
    wherein the sensitivity $(S)=Z\ 2\pi/p$ where Z is the distance between a screen and the lens and p is the period of the fringe pattern; and
    classifying whether a defect type of a defect is a transmissive defect type, a prismatic defect type, a lenslet defect type or a cosmetic defect type based on the phase visibility values and modulation visibility values at a defect location as compared to the values of a local neighborhood area.

2. The method of claim 1 further comprising:
    using a plurality of camera poses to provide the deflectometric measurements from the at least two points of view of the lens for the at least one fringe pattern, the fringe pattern having dark and bright bars.

3. The method of claim 2 further comprising:
    localizing a depth of the defect within a body of the lens; and deciding whether the defect is located on the front surface or on the back surface of the lens based on the phase visibility values and modulation visibility values from the at least two points of view and a geometry of a lens orientation to the two points of view.

4. The method of claim 2 further comprising:
    invalidating the lens based on: a) whether the defect is a transmissive defect type, a prismatic defect type, a lenslet defect type or a cosmetic defect type, number of defects and relative position, its location in the inspection area, its size, its brightness; and b) whether the defect is located on the front or the back surface of the lens.

5. The method of claim 1, wherein measuring includes measuring from the at least two points of view, both phase visibility values and modulation visibility values of the deflectometric measurements for at least two different sensitivities of the deflectometric setup using at least one set of fringe patterns of dark and bright stripes having different spatial periods that are displayed on a screen plane; and
    generating a map of measured phase visibility values and a map of measured modulation visibility values.

6. The method of claim 5, wherein detecting includes estimating a defect luminous intensity and a defect area of the defect based on the map of the measured phase visibility values and the map of the measured modulation visibility values; and
    wherein classifying the defect type includes classifying whether the defect is dust/dirt or cosmetic/functional defect based on the defect type, the defect luminous intensity and the defect area and a visual inspection standard.

7. The method of claim 5, wherein classifying the defect type includes:
    differentiating whether the defect type is a transmissive defect, a prismatic defect or a lenslet defect using the map of the measured phase visibility values and the map of the measured modulation visibility values; or
    determining a ratio of whether the defect type of the detected defect has a transmissive, prismatic, or lenslet character using the map of the measured phase visibility values and the map of the measured modulation visibility values.

8. The method of claim 5, wherein the different sensitivities are a high sensitivity $S>20\pi$ and a low sensitivity $S<\pi$ that result in a high and a low sensitivity phase map and modulation map; and wherein classifying the defect type includes classifying that the defect type is:
    a. prismatic defect type when at the defect location:
        the high and low sensitivity modulation visibility maps show a change of 0, and
        the high and low sensitivity phase visibility maps show a change of 1;
    b. lenslet defect type when at the defect location:
        the high and low sensitivity modulation visibility maps show a change of 1, and
        the high and low sensitivity phase visibility maps show a change of 0; and
    c. transmissive defect type when at the defect location:
        the high and low sensitivity modulation visibility maps show a change of 0, and
        the high and low sensitivity phase visibility maps show a change of 0.

9. The method of claim 8, wherein the lens is one of an ophthalmic lens, a contact lens, an intraocular lens, a windshield for a car, a prisms, a window, a plate, a windscreen or a mirror.

10. The method of claim, 6 wherein the at least two points of view correspond each to a first and second different lens orientation with respect to at least one camera axis orientation and optical center position, and further comprising:

localizing a depth of the defect within a body of the lens; and deciding whether the defect is located on the front surface or on the back surface of the lens based on the phase visibility values and modulation visibility values from the at least two points of view and a geometry of a lens orientation to the two points of view;

wherein localizing the defect on the front or back surface is based on the phase visibility values and the modulation visibility values; and wherein localizing the defect on the front or back surface is based on one of:
  discriminating that the defect location is on the front or back surface from the defect disparity as seen from the at least two points of view; or
  discriminating that the defect location is on the front or back surface from a triangulation of the defect position as seen from the at least two points of view.

11. The method of claim 1, wherein the measured phase visibility values and modulation visibility values are obtained from images of at least one set of fringe pattern shown on the screen, the images captured using at least two points of view by at least one camera that measure irradiance information and polarimetric information taken through or reflected by the lens; and wherein the deflectometric measurements are one of:
  transmissive deflectometric measurements where images of the fringe pattern shown on the screen are captured by the at least one camera after transmission through the lens; or
  reflective deflectometric measurements where images of the fringe pattern shown on the screen are captured by the at least one camera after reflection on both surfaces of the lens;

wherein the at least two points of view are at different positions with varying axes of viewing the inspection area for the localization of defects at the front or back side of the lens; and wherein the at least two points of view include one of:
  a separate camera at each of the at least two points of view; or
  a single camera, and one of moving the camera to the at least two points of view or moving the lens to each of two or more lens orientations to create the at least two points of view.

12. The method of claim 1, further comprising:
removing the lens from the at least two points of view;
measuring phase visibility values and modulation visibility values of phase measuring deflectometric measurements for at least two different sensitivities of the deflectometric setup using at least one fringe pattern taken without the lens from the at least two points of view; and wherein determining the phase visibility values and modulation visibility values taken with the lens includes using the measured phase visibility values and modulation visibility values.

13. An automatic visual inspection (AVI) system for detecting lens defects of semifinished or finished lenses using at least one visual inspection standard, the AVI system comprising:
at least one camera to measure phase visibility values and modulation visibility values of deflectometric measurements through an inspection area of the lens for two different sensitivities of a deflectometric setup using at least one fringe pattern taken from at least two points of view, wherein the sensitivity $(S) = Z \, 2\pi/p$ where Z is the distance between a screen and the lens and p is the period of the fringe pattern;

a detection unit to detect a defect of the lens at a defect location; and a defect type detector to differentiate whether a defect type of the defect is a prismatic defect type, a transmissive defect type, a lenslet defect type or a cosmetic defect type based on the phase visibility values and modulation visibility values at the defect location as compared to the values of a local neighborhood area.

14. The AVI system of claim 13, further comprising:
a plurality of camera poses to provide the deflectometric measurements from the at least two points of view of the lens for at least one oriented fringe pattern of dark and bright bars shown on the screen.

15. The AVI system of claim 14, further comprising:
a classifying unit to:
  localize a depth of the defect within a body of the lens; and decide whether the defect is located on the front surface or on the back surface of the lens based on the phase visibility values and modulation visibility values from the at least two points of view and a geometry of a lens orientation to the two points of view; and
an invalidating unit to invalidate the lens based on at least one visual inspection standard.

16. The AVI system of claim 13, wherein detecting includes estimating a defect luminous intensity and a defect area of the defect based on a phase visibility map of the measured phase visibility values and a visibility map of the modulation visibility values;

wherein classifying the defect type includes classifying whether the defect is dust/dirt or cosmetic/functional defect based on the defect type, the defect luminous intensity and the defect area and at least one visual inspection standard; and wherein differentiating comprises:
  differentiating whether the defect type is a transmissive defect, a prismatic defect or a lenslet defect using the map of the measured phase visibility values and the map of the measured modulation visibility values; or
  determining a ratio of whether the defect type has a transmissive, prismatic, or lenslet character of the detected defect using the map of the measured phase visibility values and the map of the measured modulation visibility values.

17. The AVI system of claim 13, wherein the different sensitivities are a high sensitivity $S > 20\pi$ and a low sensitivity $S < \pi$ that result in a high and a low sensitivity phase map and modulation map; and wherein classifying the defect type includes classifying that the defect type is:
  a. prismatic defect type when at the defect location:
    the high and low sensitivity modulation visibility maps show a change of 0, and
    the high and low sensitivity phase visibility maps show a change of 1;
  b. lenslet defect type when at the defect location:
    the high and low sensitivity modulation visibility maps show a change of 1, and
    the high and low sensitivity phase visibility maps show a change of 0; and
  c. transmissive defect type when at the defect location:
    the high and low sensitivity modulation visibility maps show a change of 0, and
    the high and low sensitivity phase visibility maps show a change of 0.

18. The AVI system of claim 17, wherein the high and low sensitivities are based on a distance between the screen and the lens and the fringe period of the fringe pattern; and are created by:
- a first set of dark and bright stripes for high sensitivity having S>20π and p=4 mm; and
- a second set of dark and bright stripes for low sensitivity having S<π, p=420 mm.

19. The AVI system of claim 13, wherein the at least two points of view correspond each to a different lens orientation;
wherein localizing the defect on the front or back surface is based on the phase map and the modulation map; and
wherein localizing the defect on the front or back surface is based on one of:
- discriminating that the defect location is on the front or back surface from the defect disparity as seen from the at least two points of view; or
- discriminating that the defect location is on the front or back surface from a triangulation of the defect position as seen from the at least two points of view.

20. The AVI system of claim 13, further comprising a calibration system including:
- removing the lens from the at least two points of view;
- measuring phase visibility values and modulation visibility values of phase measuring deflectometric measurements for at least two different sensitivities of the deflectometric setup using at least one fringe pattern taken without the lens from the at least two points of view; and
- calculating sensitivities of the deflectometric setup and modulation base values for the AVI system using the phase visibility values and modulation visibility values taken with the lens.

21. An ophthalmic lens production line comprising:
- a first automatic visual inspection (AVI) system for detecting lens defects of semifinished lenses using a first visual inspection standard;
- a coating process for coating a frontal surface of the semifinished lenses to create coated blank lenses;
- a second AVI system for detecting lens defects at a frontal surface of the coated blank lenses using a second visual inspection standard;
- a lens surfacing process for surfacing a back surface of the coated blank lenses to create ophthalmic finished lenses;
- a third AVI system for detecting lens defects at a frontal surface or a back surface of the ophthalmic finished lenses using a third visual inspection standard;
- wherein each of the first, second and third AVI system include:
  - a lens holder to orient the lenses to provide deflectometric measurements from at least two points of view of the lenses for at least one fringe pattern of dark and bright bars shown on a screen;
  - at least one camera to measure phase visibility values and modulation visibility values of the deflectometric measurements through an inspection area of the lenses for two different sensitivities of a deflectometric setup;
  - wherein the sensitivity $(S) = Z\,2\pi/p$ where Z is the distance between the screen and the lens and p is the period of the fringe pattern;
  - a detection unit to detect a defect of the lenses at a defect location in the inspection area based on the phase visibility values and modulation visibility values at the defect location as compared to the values of a local neighborhood area;
  - a defect type unit to differentiate whether a defect type of the defect is a prismatic defect type, a transmissive defect type, a lenslet defect type or a cosmetic defect type based on the phase visibility values and modulation visibility values at the defect location as compared to the values of a local neighborhood area;
  - a localizer unit to localize the defect as being located on the frontal surface or on the back surface of the lenses based on the phase visibility values and modulation visibility values from the at least two points of view and a geometry of the lens orientation to the two points of view; and
  - an invalidating system for invalidating a lens based on whether the defect is a prismatic defect type, a transmissive defect type, a lenslet defect type or a cosmetic defect type, and based on whether the defect is located on the frontal or the back surface of the lenses.

22. The production line of claim 21, wherein the invalidating system invalidates the lens if:
- the first AVI system detects a defect that is a cosmetic defect type on the front surface of the semifinished lenses but not a defect that is a transmissive defect type on the front surface of the semifinished lenses and not a defect that is on the back surface of the semifinished lenses;
- the second AVI system detects a defect that is a cosmetic defect type on the front surface of the coated blank lenses but not a defect that is a transmissive defect type on the front surface of the coated blank lenses and not a defect that is on the back surface of the coated blank lenses; or
- the third AVI system detects a defect that is a cosmetic defect type on the front surface or the back surface of the ophthalmic finished lenses but not a defect that is a transmissive defect type on the front surface or the back surface of the ophthalmic finished lenses.

23. The production line of claim 22, wherein the invalidating system comprises:
- a defect warning comprising at least one of a light, a sound, a display message or a network message transmission indicating:
- detection of the defect,
- identification of the defect type of the defect and the surface the defect is on,
- whether the lens is invalidated at the first, second or third AVI system, and
- identifying which lens has the defect.

* * * * *

UNITED STATES PATENT AND TRADEMARK OFFICE
CERTIFICATE OF CORRECTION

| | |
|---|---|
| PATENT NO. | : 11,650,126 B2 |
| APPLICATION NO. | : 17/028429 |
| DATED | : May 16, 2023 |
| INVENTOR(S) | : Mellado et al. |

It is certified that error appears in the above-identified patent and that said Letters Patent is hereby corrected as shown below:

In the Specification

Column 9, Line 57: Replace "$\varphi y(M)=2\eta l/p$" with --$\varphi y(M)=2\pi l/p$--

Signed and Sealed this
Thirteenth Day of June, 2023

Katherine Kelly Vidal
*Director of the United States Patent and Trademark Office*